US009584820B2

(12) United States Patent
Deshpande

(10) Patent No.: US 9,584,820 B2
(45) Date of Patent: Feb. 28, 2017

(54) METHOD FOR SIGNALING A GRADUAL TEMPORAL LAYER ACCESS PICTURE

(71) Applicant: Huawei Technologies Co., Ltd., Shenzhen (CN)

(72) Inventor: Sachin G. Deshpande, Camas, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/408,668

(22) PCT Filed: Jun. 24, 2013

(86) PCT No.: PCT/JP2013/003941
§ 371 (c)(1),
(2) Date: Dec. 17, 2014

(87) PCT Pub. No.: WO2014/002469
PCT Pub. Date: Jan. 3, 2014

(65) Prior Publication Data
US 2015/0189299 A1    Jul. 2, 2015

Related U.S. Application Data

(60) Provisional application No. 61/664,140, filed on Jun. 25, 2012.

(51) Int. Cl.
*H04N 19/44* (2014.01)
*H04N 19/503* (2014.01)
(Continued)

(52) U.S. Cl.
CPC .......... *H04N 19/44* (2014.11); *H04N 19/107* (2014.11); *H04N 19/187* (2014.11); *H04N 19/31* (2014.11); *H04N 19/503* (2014.11); *H04N 19/70* (2014.11)

(58) Field of Classification Search
CPC ...... H04N 19/70; H04N 19/31; H04N 19/107; H04N 19/52; H04N 19/573; H04N 19/187;
(Continued)

(56) References Cited

U.S. PATENT DOCUMENTS

2009/0003439 A1\*  1/2009  Wang .................... H04N 19/31
                                                      375/240.08
2009/0304070 A1\* 12/2009  Lamy-Bergot ..... H04N 21/2383
                                                      375/240.02
(Continued)

FOREIGN PATENT DOCUMENTS

CN        101981936 A      2/2011
EP           2805520 A1   11/2014
(Continued)

OTHER PUBLICATIONS

Official Communication issued in International Patent Application No. PCT/JP2013/003941, mailed on Jul. 30, 2013.
(Continued)

*Primary Examiner* — Jingge Wu
(74) *Attorney, Agent, or Firm* — Leydig, Voit & Mayer, Ltd

(57) ABSTRACT

An electronic device for encoding a picture is described. The electronic device includes a processor and instructions stored in memory that are in electronic communication with the processor. The instructions are executable to encode a gradual temporal layer access (GTLA) picture. The instructions are further executable to send the GTLA picture.

24 Claims, 11 Drawing Sheets

(51) Int. Cl.
*H04N 19/70* (2014.01)
*H04N 19/107* (2014.01)
*H04N 19/187* (2014.01)
*H04N 19/31* (2014.01)

(58) Field of Classification Search
CPC ...... H04N 19/503; H04N 19/33; H04N 19/44; H04N 19/50; H04N 19/61; H04N 19/45; H04N 19/109
See application file for complete search history.

(56) References Cited

U.S. PATENT DOCUMENTS

| | | | | |
|---|---|---|---|---|
| 2011/0280552 | A1* | 11/2011 | Ikeuchi | H04N 13/0055 386/343 |
| 2012/0230401 | A1* | 9/2012 | Chen | H04N 21/44016 375/240.12 |
| 2012/0230409 | A1* | 9/2012 | Chen | H04N 19/105 375/240.15 |
| 2013/0064284 | A1* | 3/2013 | Samuelsson | H04N 19/70 375/240.01 |
| 2013/0077681 | A1* | 3/2013 | Chen | H04N 19/105 375/240.12 |
| 2013/0089134 | A1* | 4/2013 | Wang | H04N 19/70 375/240.01 |
| 2013/0094585 | A1* | 4/2013 | Misra | H04N 19/503 375/240.16 |
| 2013/0094772 | A1* | 4/2013 | Deshpande | H04N 19/70 382/233 |
| 2013/0094773 | A1* | 4/2013 | Misra | H04N 19/46 382/233 |
| 2013/0094774 | A1* | 4/2013 | Misra | H04N 19/70 382/233 |
| 2013/0107953 | A1 | 5/2013 | Chen et al. | |
| 2013/0114670 | A1 | 5/2013 | Chen et al. | |
| 2013/0114743 | A1 | 5/2013 | Sjoeberg et al. | |
| 2013/0170561 | A1* | 7/2013 | Hannuksela | H04N 21/23424 375/240.25 |
| 2013/0272372 | A1* | 10/2013 | Hannuksela | H04N 19/00 375/240.01 |
| 2013/0279564 | A1* | 10/2013 | Wang | H04N 19/00139 375/240.02 |
| 2014/0064363 | A1* | 3/2014 | Samuelsson | H04N 19/50 375/240.12 |
| 2014/0169449 | A1 | 6/2014 | Samuelsson et al. | |
| 2015/0071341 | A1* | 3/2015 | Sjoberg | H04N 19/31 375/240.02 |
| 2015/0124864 | A1* | 5/2015 | Kim | H04N 19/70 375/240.02 |
| 2015/0131744 | A1* | 5/2015 | Samuelsson | H04N 19/46 375/240.26 |
| 2015/0189299 | A1* | 7/2015 | Deshpande | H04N 19/503 382/233 |

FOREIGN PATENT DOCUMENTS

| | | |
|---|---|---|
| WO | WO 2005074294 A1 | 8/2005 |
| WO | WO 2008048886 A2 | 4/2008 |
| WO | WO 2013109178 A1 | 7/2013 |

OTHER PUBLICATIONS

Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d4, Apr. 27-May 7, 2012, 10 pages.
Deshpande, "On Gradual Temporal Layer Access", Joint Collaborative Team on Video Coding (JCT-VC) of ITU-T SG16 WP3 and ISO/IEC JTC1/SC29/WG11, JCTVC-J0305, Jul. 11-20, 2012, pp. 1-5.
Schwarz et al., "Overview of the Scalable Video Coding Extension of the H.264/AVC Standard," IEEE Transactions on Circuits and Systems for Video Technology, vol. 17, Issue 9, pp. 1103-1120, Institute of Electrical and Electronics Engineers, New York, New York (Sep. 2007).
Maani et al., "Optimized Bit Extraction Using Distortion Modeling in the Scalable Extension of H.264/AVC," IEEE Transactions on Image Processing, vol. 18, Issue 9, pp. 2022-2029, Institute of Electrical and Electronics Engineers, New York, New York (Sep. 2009).
Samuelsson et al., "Temporal layer access pictures," Joint Collaborative Team on Video Coding (JCT-VC) of ITU-T SG16 WP3 and ISO/IEC JTC1/SC29/WG11, 8$^{th}$ Meeting: San Jose, California, Document JCTVC-H0566 (Feb. 1-10, 2012).
Samuelsson et al., "TLA picture restriction," Joint Collaborative Team on Video Coding (JCT-VC) of ITU-T SG 16 WP 3 and ISO/IEC JTC 1/SC 29/WG 11, JCTVC-I0236, 9th Meeting, Geneva, CH, International Telecommunication Union, Geneva, Switzerland (Apr. 27-May 7, 2012).
Search Report in cognate Chinese Application No. 201380033105.0 (Aug. 25, 2016).

* cited by examiner

METHOD FOR SIGNALING A GRADUAL TEMPORAL LAYER ACCESS PICTURE

TECHNICAL FIELD

The present disclosure relates generally to electronic devices. More specifically, the present disclosure relates to methods for signaling a gradual temporal layer access picture.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

SUMMARY OF INVENTION

Technical Problem

It is desired to provide more efficient techniques for representing digital media.

Solution to Problem

An aspect of the invention provides an electronic device for decoding a picture, including:
a processor;
a memory in electronic communication with the processor, wherein instructions stored in the memory are executable to:
(a) receive a bitstream;
(b) obtain a GTLA picture;
(c) decode the GTLA picture; and
(d) decode a current picture based on the GTLA picture.

Another aspect of the invention provides an electronic device for encoding a picture, including:
a processor;
a memory in electronic communication with the processor, wherein instructions stored in the memory are executable to:
(a) encode a gradual temporal layer access (GTLA) picture; and
(b) send the GTLA picture.

Another aspect of the invention provides a method for decoding a picture by an electric device, including:
(a) receiving a bitstream;
(b) obtaining a GTLA picture
(c) decoding the GTLA picture; and
(d) decoding a current picture based on the GTLA picture.

Another aspect of the invention provides a method for encoding a picture by an electronic device, including:
(a) encoding a GTLA picture; and
(b) sending the GTLA picture.

Advantageous Effects of Invention

The foregoing and other objectives, features, and advantages of the invention will be more readily understood upon consideration of the following detailed description of the invention, taken in conjunction with the accompanying drawings.

DESCRIPTION OF EMBODIMENTS

Figure 1:
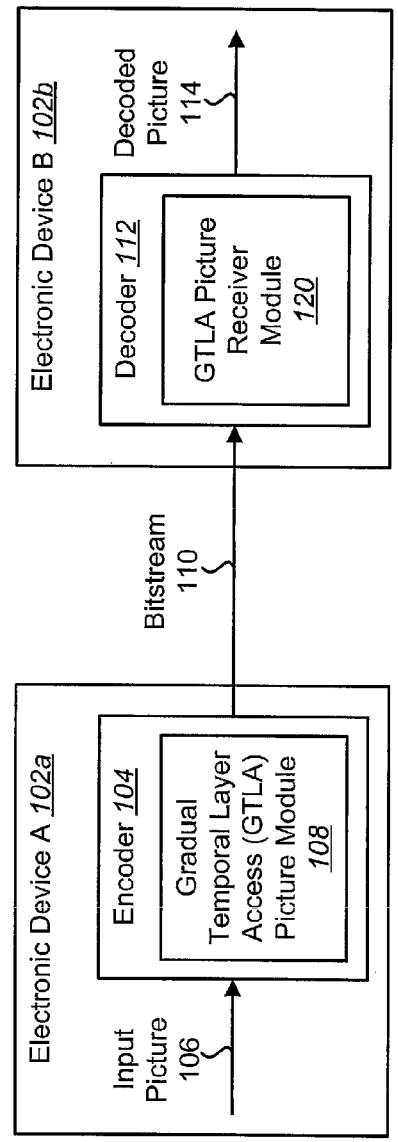
FIG. 1 is a block diagram illustrating an example of one or more electronic devices in which systems and methods for signaling a gradual temporal layer access (GTLA) picture may be implemented.

An electronic device for encoding a picture is described. The electronic device includes a processor and instructions stored in memory that are in electronic communication with the processor. The instructions are executable to encode a gradual temporal layer access (GTLA) picture. The instructions are further executable to send the GTLA picture.

The electronic device may also include instructions executable to generate a GTLA picture indicator and to send the GTLA picture indicator. The GTLA picture indicator may be signaled a Sequence Parameter Set (SPS), a Picture Parameter Set (PPS), Adaptation Parameter Set (APS), Video Parameter Set (VPS) and/or a slice header.

The GTLA picture indicator may be a Network Access Layer (NAL) unit type. The NAL unit type may include a NAL unit type associated with the GTLA picture. The NAL unit type associated with the GTLA picture may equal nine.

The GTLA picture may include a temporal identifier. A subsequent picture that is encoded after the GTLA picture, having a temporal identifier equal to the temporal identifier of the GTLA picture may not use a previous picture for inter prediction that has a temporal identifier greater or equal to the temporal identifier of the GTLA picture and that precedes the GTLA picture in decoding order.

A subsequent picture in decoding order that is encoded after the GTLA picture, having a temporal identifier equal to the temporal identifier of the GTLA picture may use a previous picture for inter prediction that has a temporal identifier less than the temporal identifier of the GTLA picture and that precedes the GTLA picture in decoding order.

No reference picture with a temporal identifier greater than or equal to the temporal identifier of the GTLA picture may be included in a reference picture set (RPS) short-term current before list, a RPS short-term current after list and/or a RPS long-term current list for a current picture. For a picture subsequent to the GTLA picture with temporal identifier equal to the temporal identifier of the GTLA picture, no reference picture with a temporal identifier greater than or equal to the temporal identifier of the GTLA picture may be included in a RPS short-term current before list, a RPS short-term current after list, and/or a RPS long-term current list for a current picture.

The GTLA picture may provide temporal layer switching functionality. The GTLA picture may be a temporal layer access (TLA) picture and the GTLA picture may be marked as a GTLA picture. The GTLA picture may be a TLA picture and the GTLA picture may be marked as a TLA picture. The GTLA picture may be not a tagged for discard (TFD) picture.

An electronic device for decoding a picture is also described. The electronic device includes a processor and instructions stored in memory that are in electronic communication with the processor. The instructions are executable to obtain a GTLA picture. The instructions are also executable to decode the GTLA picture. The instructions are further executable to decode a current picture based on the GTLA picture.

The instructions may be further executable to obtain a GTLA picture indicator. The GTLA picture indicator may be received in a SPS, a PPS, APS, VPS and/or a slice header.

The GTLA picture may include a temporal identifier. A subsequent picture that is decoded after the GTLA picture, having a temporal identifier equal to the temporal identifier of the GTLA picture may not use a previous picture for inter prediction that has a temporal identifier greater or equal to the temporal identifier of the GTLA picture and that precedes the GTLA picture in decoding order.

A subsequent picture that may be decoded after the GTLA picture, having a temporal identifier equal to the temporal identifier of the GTLA picture uses a previous picture for inter prediction that has a temporal identifier less than the temporal identifier of the GTLA picture and that precedes the GTLA picture in decoding order.

A method for encoding a picture by an electronic device is also described. A GTLA picture is encoded. The GTLA picture is sent.

A method for decoding a picture by an electric device is also described. A bitstream is received. A GTLA picture is obtained. The GTLA picture is decoded. A current picture is decoded based on the GTLA picture.

The systems and methods disclosed herein describe approaches signaling a gradual temporal layer access (GTLA) picture. For example, some configurations described herein include devices and methods for signaling GTLA pictures using a corresponding Network Access Layer (NAL) unit.

In known systems, temporal layer access (TLA) pictures may be currently signaled in a bitstream. TLA pictures unify the signaling of Clean Random Access (CRA) pictures and temporal layer switching points. A CRA picture may indicate a random access point (RAP), or a point from which a decoder can start to decode without having access to pictures that precedes the CRA picture in decoding order. In some cases, a CRA picture may include intra-prediction slices (I-slices) that are decoded using intra predictions.

As used herein, the term "temporal layer" refers to all pictures with the same temporal identifier (temporal_id) or all pictures on the same temporal level. Additional detail regarding temporal layers will be described below in greater detail in connection with FIGS. 2 and 3.

A temporal layer switching point is a picture that represents a point in the bitstream where it is possible to start decoding a larger number of temporal layers than what was decoded before the switching point. As such, there is no picture following the switching point in both decoding order and display order that uses any picture that preceded the switching point in decoding order or display order. The temporal layer switching point may be signaled in a picture parameter set (PPS) or other parameter set.

In some configurations, a NAL unit type may specify the type of raw byte sequence payload (RBSP) data structure included in a NAL unit. In one example, a NAL unit that uses a NAL unit type equal to 0 or in the range of 24-63 may not affect the decoding process specified in various configurations. It should be noted that in some configurations, NAL unit types 0 and 24-63 may be used as determined by various applications. NAL unit types 0 and 24-63 may be reserved for future use. In some configurations described herein, a decoder may ignore contents of NAL units that use reserved or unspecified values of NAL unit types.

Examples of NAL unit type codes and NAL unit type classes that may be implemented in accordance with the systems and methods disclosed herein are included in Table 1 and Table 2 below. It may be noted that some configurations may include similar and different fields to those described below.

In some configurations, some or all of the NAL fields in Table 1 may be examples of different NAL unit types. In some configurations, certain NAL unit types may be associated with different fields and syntax structures associated with one or more pictures. Further explanations of one or more fields are included below. It should be noted that Table 1 below includes abbreviations for Video Coding Layer (VCL) NAL unit type classes, Random Access Point (RAP), Tagged For Discard (TFD), Instantaneous Decoding Refresh (IDR) and Temporal Layer Access (TLA) pictures. Examples included in relation to Table 1 may also be applicable to Table 2 and other configurations described below.

[Table 1]

Table 1 is organized into columns NAL unit type (nal_unit_type), content of NAL unit and RBSP syntax structure and NAL unit type class. In Table 1, the syntax may include supplemental enhancement (SEI) information RBSP syntax. An SEI RBSP may include one or more SEI messages. Each SEI message may include variables specifying the type (e.g., payloadType) and size (e.g., payloadSize) of the SEI payload. The derived SEI payload size may be specified in bytes and may be equal to the number of RBSP bytes in the SEI payload.

Table 1 includes NAL unit types. NAL unit type specifies the type of RBSP data structure included in the NAL unit. If the NAL unit type indicates a picture with reserved NAL unit type value, such as a NAL unit type of 32-47, a decoder should ignore and discard the contents of the picture. This requirement allows future definition of compatible extensions to be added and standardized.

In Table 1, when the value of NAL unit type is equal to 3 for all VCL NAL units of a particular picture, that particular picture is referred to as a TLA picture. A TLA picture and all coded pictures with a temporal identifier (temporal_id) greater than or equal to the temporal identifier of the TLA picture that follow the TLA picture in decoding order may not use inter prediction from any picture with temporal_id greater than or equal to the temporal identifier of the TLA picture that precedes the TLA picture in decoding order. Also, a TLA picture may not be a TFD picture; hence TLA pictures are also referred to as a non-TFD TLA picture.

In some configurations, a NAL unit type equal to 3 represents when a temporal identifier nesting flag is equal to 1 and a temporal identifier is greater than 0. When NAL unit type is equal to 3, the temporal identifier may not be equal to 0.

When the value of NAL unit type is equal to 4 or 5 for all VCL NAL units of a particular picture, the particular picture is referred to as a CRA picture. A CRA picture having NAL unit type equal to 4 may have associated TFD pictures present in the bitstream. A CRA picture having NAL unit type equal to 5 may not have associated TFD pictures present in the bitstream.

When the value of NAL unit type is equal to 6 or 7 for all VCL NAL units of a particular picture, the particular picture is referred to as a broken link access (BLA) picture. A BLA picture having a NAL unit type equal to 6 may have associated TFD pictures present in the bitstream. A BLA picture having NAL unit type equal to 7 may not have associated TFD pictures present in the bitstream.

In some known configurations, such as in Benjamin Bros et al., "High efficiency video coding (HEVC) text specification draft 7", JCTVC-I1003, Geneva, May 2012, coded pictures that follow a CRA or BLA picture both in decoding order and output order do not use inter prediction from any picture that precedes the CRA or BLA picture either in decoding order or output order. Further, any picture that precedes the CRA or BLA picture in decoding order also precedes the CRA or BLA picture in output order. In the above known configuration, it is a requirement of bitstream conformance that no TFD pictures are present in the bitstream that are associated with a CRA picture having NAL unit type equal to 5 or a BLA picture having NAL unit type equal to 7.

In Table 1, when the value of NAL unit type is equal to 8 for all VCL NAL units of a particular picture, that particular picture is referred to as an IDR picture. Coded pictures that follow an IDR picture in decoding order do not use inter prediction from any picture that precedes the IDR picture in decoding order. Any picture that precedes the IDR picture in decoding order also precedes the IDR picture in output order.

NAL unit types in the range of 1 to 8, inclusive, refer to a VCL NAL unit. In other words, when the value of a NAL unit type is equal to any value in the range of 1 to 8, inclusive, for a NAL unit of a particular picture, all VCL NAL units of that particular picture may have nal_unit_type equal to that particular value.

NAL unit types in the range of 4 to 8, inclusive, may indicate a random access point (RAP) picture. A RAP picture refers to a coded picture that is a CRA picture, a BLA picture or an IDR picture. A RAP access unit refers to an access unit that is a CRA access unit, a BLA access unit or an IDR access unit. A RAP picture may discard all access units before a particular RAP access unit. When an access unit is a RAP access unit, the temporal identifier for all VCL NAL units of the access unit may be equal to 0.

In Table 1, any parameter set (video parameter set (VPS), sequence parameter set (SPS), picture parameter set (PPS) or adaptation parameter set (APS)) must be available before the activation of the parameter set. Also, to be able to perform random access from a particular RAP unit, each parameter set activated during the decoding of the particular RAP access unit or during the decoding of any subsequent access unit in decoding order must be present or provided through external means at or subsequent to that particular RAP access unit and prior to any NAL unit activating that parameter set. This condition allows for correctly decoding the particular RAP access unit and all the subsequent access units in both decoding and output order.

In some configurations, the systems and methods disclosed herein describe a GTLA picture. A GTLA picture may be a coded picture for which each slice has NAL unit type equal to 9.

A GTLA picture and all coded pictures with a temporal identifier (temporal_id) equal to the temporal identifier of the GTLA picture that follow the GTLA picture in decoding order may not use inter prediction from any picture with a temporal identifier greater than or equal to the temporal identifier of the GTLA picture that precedes the GTLA picture in decoding order. Also, a GTLA picture may not be TFD picture; hence GTLA pictures are also referred to as non-TFD GTLA picture.

A GTLA picture may provide advantages over a TLA picture. For example, a GTLA picture may provide added flexibility in selection of reference pictures while providing temporal layer switching functionality. Further, a GTLA picture may allow selection of desired frame rate in a step-by-step manner. Additional benefits and advantages will be described below.

In some systems and methods for signaling a GTLA picture described herein, one or more indicators may be implemented to indicate a GTLA picture in a bitstream. For example, in one configuration, a new NAL unit may be introduced to indicate a GTLA picture in the bitstream.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods.

FIG. 1 is a block diagram illustrating an example of one or more electronic devices 102a-b in which systems and methods for signaling a gradual temporal layer access (GTLA) picture may be implemented. In this example, electronic device A 102a and electronic device B 102b are illustrated. However, it should be noted that one or more of the features and functionality described in relation to electronic device A 102*a* and electronic device B 102*b* may be combined into a single electronic device in some configurations.

Electronic device A 102*a* includes an encoder 104 and a GTLA picture module 108. Each of the elements included within electronic device A 102*a* (e.g., the encoder 104 and GTLA picture module 108) may be implemented in hardware, software or a combination of both.

Electronic device A 102*a* may obtain an input picture 106. In some configurations, the input picture 106 may be captured on electronic device A 102*a* using an image sensor, retrieved from memory and/or received from another electronic device.

The encoder 104 may encode the input picture 106 to produce encoded data. For example, the encoder 104 may encode a series of input pictures 106 (e.g., video). In one configuration, the encoder 104 may be a High Efficiency Video Coding (HEVC) encoder. The encoded data may be included in a bitstream 110. The encoder 104 may generate overhead signaling based on the input picture 106.

In some configurations, the GTLA picture module 108 may include a GTLA picture as well as an indicator corresponding to the GTLA picture. The GTLA picture and the corresponding GTLA picture indicator may be generated by the GTLA picture module 108.

In some configurations, the GTLA picture module 108 may send or otherwise share the GTLA picture and/or a corresponding GTLA picture indicator with one or more electronic devices 102. In one example, electronic device A 102*a* may send one or more GTLA pictures and/or corresponding GTLA picture indicators to electronic device B 102*b*. One benefit of generating a GTLA picture and/or a corresponding GTLA picture indicator may include providing greater flexibility in selection of reference pictures while providing temporal layer switching functionality.

One or more kinds of indicators may be described in accordance with the systems and methods disclosed herein. For example, the encoder 104 may identify a GTLA picture with one or more indicators. Further detail is given below. It should be noted that the GTLA picture module 108 may be included within the encoder 104 in some configurations.

The encoder 104 (and GTLA picture module 108, for example) may produce a bitstream 110. The bitstream 110 may include encoded data based on the input picture 106. In one example, the bitstream 110 may include encoded picture data. In some configurations, the bitstream 110 may also include overhead data, such as slice header information, PPS information, SPS information, APS information, VPS information, etc. In some cases, a slice header, PPS information, SPS information, APS information or VPS information may be referred to as high-level syntax. The bitstream 110 may also include other data, some examples of which are described herein. As additional input pictures 106 are encoded, the bitstream 110 may include one or more GTLA pictures. Additionally or alternatively, the bitstream 110 may include one or more GTLA picture indicators and other encoded data.

The bitstream 110 may be provided to a decoder 112. In one example, the bitstream 110 may be transmitted to electronic device B 102*b* using a wired or wireless link. In some cases, this may be done over a network, such as the Internet, Local Area Network (LAN) or other type of network for communicating between devices. As illustrated in FIG. 1, the decoder 112 may be implemented on electronic device B 102*b* separately from the encoder 104 on electronic device A 102*a*. It should be noted that in some configurations, the encoder 104 and decoder 112 may be implemented on the same electronic device. In an implementation where the encoder 104 and decoder 112 are implemented on the same electronic device, for instance, the bitstream 110 may be made available to the decoder in a variety of ways. For example, the bitstream 110 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may obtain (e.g., receive) the bitstream 110. The decoder 112 may generate one or more decoded pictures 114 based on the bitstream 110. A decoded picture 114 may be displayed, played back, stored in memory and/or transmitted to another device, etc.

The decoder 112 may include a GTLA picture receiver module 120. The GTLA picture receiver module 120 may enable electronic device B 102*b* to obtain a GTLA picture and/or a GTLA picture indicator from the bitstream 110. In some configurations, the GTLA picture receiver module 120 may obtain a GTLA picture based on whether the bitstream 110 includes a GTLA picture indicator.

Electronic device B 102*b* may also perform one or more operations on the bitstream 110. In one example, an operation or process performed on the bitstream 110 may be based on whether a GTLA picture or GTLA picture indicator is present. In some configurations, the decoder 112 or other element on electronic device B 102*b* may perform the operation on the bitstream 110. Furthermore, other operations may also be performed on the bitstream 110.

In some configurations, electronic device B 102*b* may output a decoded picture 114. In one example, the decoded picture 114 may be transmitted to another device or back to electronic device A 102*a*. In one configuration, the decoded picture 114 may be stored or otherwise maintained on electronic device B 102*b*. In another configuration, electronic device B 102*b* may display the decoded picture 114. In yet another configuration, the decoded picture 114 may include elements of the input picture 106 with different properties based on the encoding and other operations performed on the bitstream 110. In some configurations, the decoded picture 114 may be included in a picture stream with a different resolution, format, specifications or other attribute from the input picture 106.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application specific integrated circuit (ASIC), a large-scale integrated circuit (LSI) or integrated circuit, etc.

Figure 2:
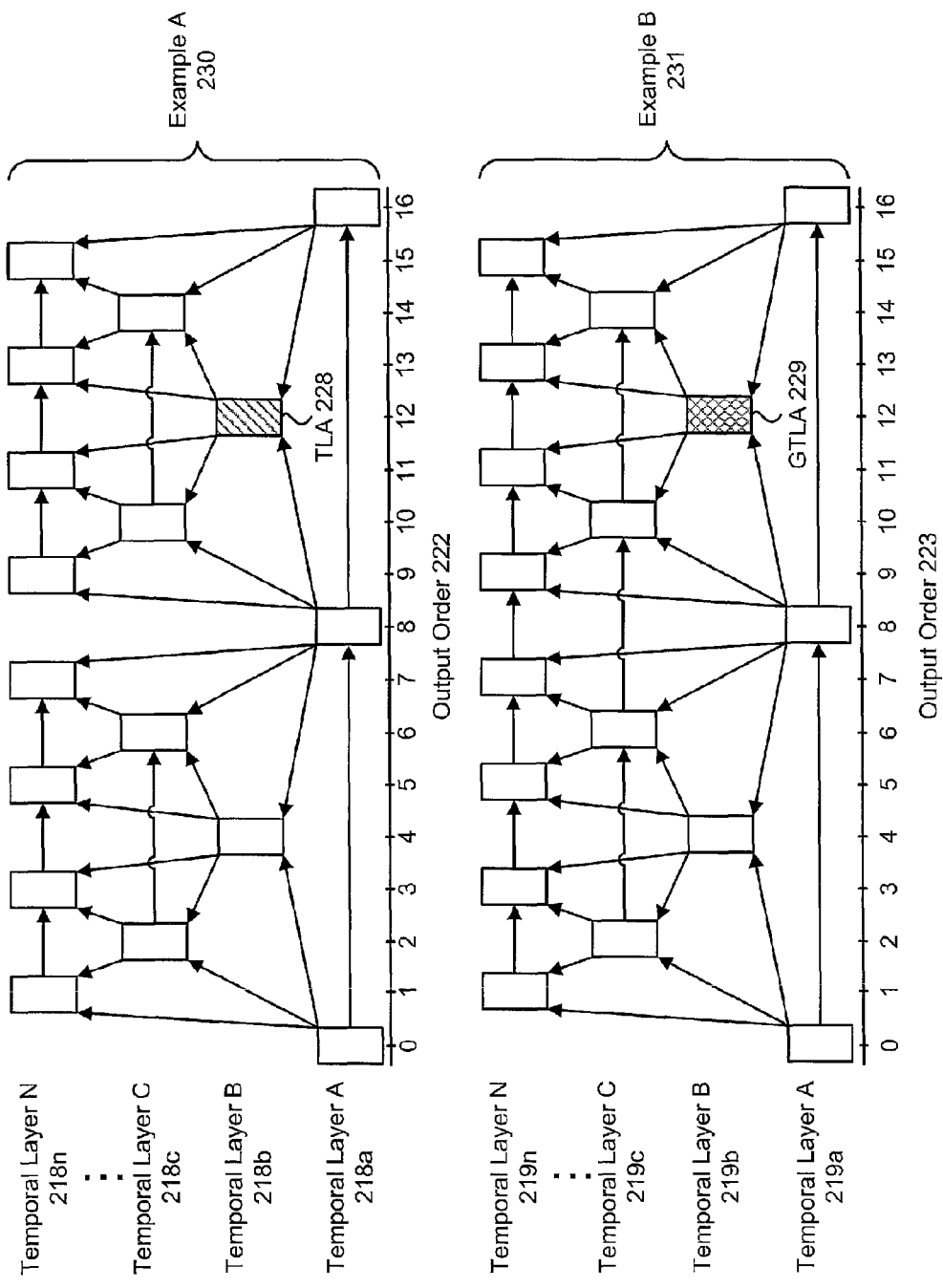
FIG. 2 is a block diagram illustrating two examples of a coding structure.

FIG. 2 is a block diagram illustrating two examples of a coding structure. Example A 230 illustrates a coding structure when using a temporal layer access (TLA) picture 228. Example B 231 illustrates a coding structure when using a gradual temporal layer access (GTLA) picture 229.

The horizontal access in example A 230 represents the output order 222 of pictures in a coding structure. The output order may start at zero and count upwards (e.g., from left to right) and may be used to identify corresponding pictures in the code structure. By way of example, example A 230 has an output order 222 from 0-16 that corresponds to pictures 0-16, respectively.

In example A 230, the vertical access represents temporal layers 218. Each temporal layer 218*a-n* may include one or more pictures. Each picture on the same temporal layer 218 may have the same temporal identifier. For example, all pictures on temporal layer A 218*a* may have temporal_id equal to zero, all pictures on temporal layer B 218*b* may have temporal_id equal to one, all pictures on temporal layer C 218*c* may have temporal_id equal to two, all pictures on temporal layer N 218*n* may have temporal_id equal to N−1, etc.

As shown in example A 230, there may be a number of temporal layers 218*a-n*. For example, there may be two, three, four, eight, sixteen, etc. temporal layers 218. Each temporal layer 218 may include a different number of pictures. In some configurations, temporal layers 218 are organized in a hierarchal form. Each higher temporal layer 218, above the base layer (e.g., temporal layer A 218*a*), may include more pictures than the preceding lower temporal layers 218. For example, temporal layer N 218*n* may include twice as many pictures as temporal layer C 218*c*, and temporal layer C 218*c* may include twice as many pictures as temporal layer B 218*b*. Higher temporal layers 218 with greater number of pictures may provide higher frame rates for decoded pictures.

Each temporal layer 218 may have a variety of picture and slice types. For example, temporal layer A 218*a* may have a picture with an intra-prediction slice (I-slice) and a picture with a predictive slice (P-slice). Temporal layer C 218*a* may have pictures with bi-predictive slices (B-slices). Temporal layer B 218*b* may have pictures with P-slices and pictures with B-slices.

In example A 230, a TLA picture 228 is shown. For example the TLA picture 228 may be the 12 th picture in the coding order 222. A TLA picture may be a Clean Random Access (CRA) pictures and/or a temporal layer switching point.

The electronic device 102 may use a temporal layer switching functionality indicated by a TLA picture 228 to switch between temporal layers 218. For example, the electronic device 102 may use a temporal layer switching point to indicate a switch between temporal layer A 218*a* and temporal layer B 218*b*.

Example B 231 illustrates a coding structure when using a gradual temporal layer access (GTLA) picture 229. Example B 231 includes temporal layers 219*a-n* and an output order 223 similar to corresponding temporal layers 218*a-n* and output order 222 described in connection with example A 230 of FIG. 2. For example, example B 231 may have pictures outputted in an output order 223 of 0-16.

Each temporal layer 219*a-n* may include one or more pictures. Each picture on the same temporal layer 219 may have the same temporal identifier. For example, all pictures on temporal layer B 219*b* may have the same temporal_id. The temporal layers 219*a-n* may be organized in a hierarchical manner with each higher temporal layer 219, above the base layer (e.g., temporal layer A 219*a*), having more pictures than lower temporal layers 219. For example, temporal layer N 219*n* may have eight pictures while temporal layer B 218*b* may have two pictures. Higher temporal layers 219 with greater number of pictures may provide higher frame rates for decoded pictures.

In example B 231, a GTLA picture 229 is shown. For example, the GTLA picture 229 may be the 12 th picture in the output order 223.

A GTLA picture coded structure may provide greater flexibility in the selection of reference pictures than a TLA picture coded structure, while still providing temporal layer switching functionality. For example, picture 9, as shown by the output order 223, may be able to use pictures 7, 8 and 10 as reference pictures under a coding structure with a GTLA picture 229. In contrast, under a coding structure with a TLA picture 228, such as shown in example A 230, picture 7 is not available as a reference picture for picture 9. Similarly, picture 10, as shown by the output order 223, may be able to use pictures 6, 8 and 12 as reference pictures. This allows the electronic device 102 to have greater flexibility in the selection of reference pictures by allowing additional reference to be used.

Further, because additional pictures may be used as reference pictures, better compression efficiency may be achieved compared to compression rates of TLA pictures 228. For example, because picture 9 may use picture 7 as a reference picture in addition to pictures 8 and 10, picture 9 may be further compressed. In other words, the additional compression is a result of having a greater selection of reference pictures to choose from. This is in contrast to a coding structure with TLA pictures 228, which do not employ additional pictures to use as reference pictures.

Figure 3:
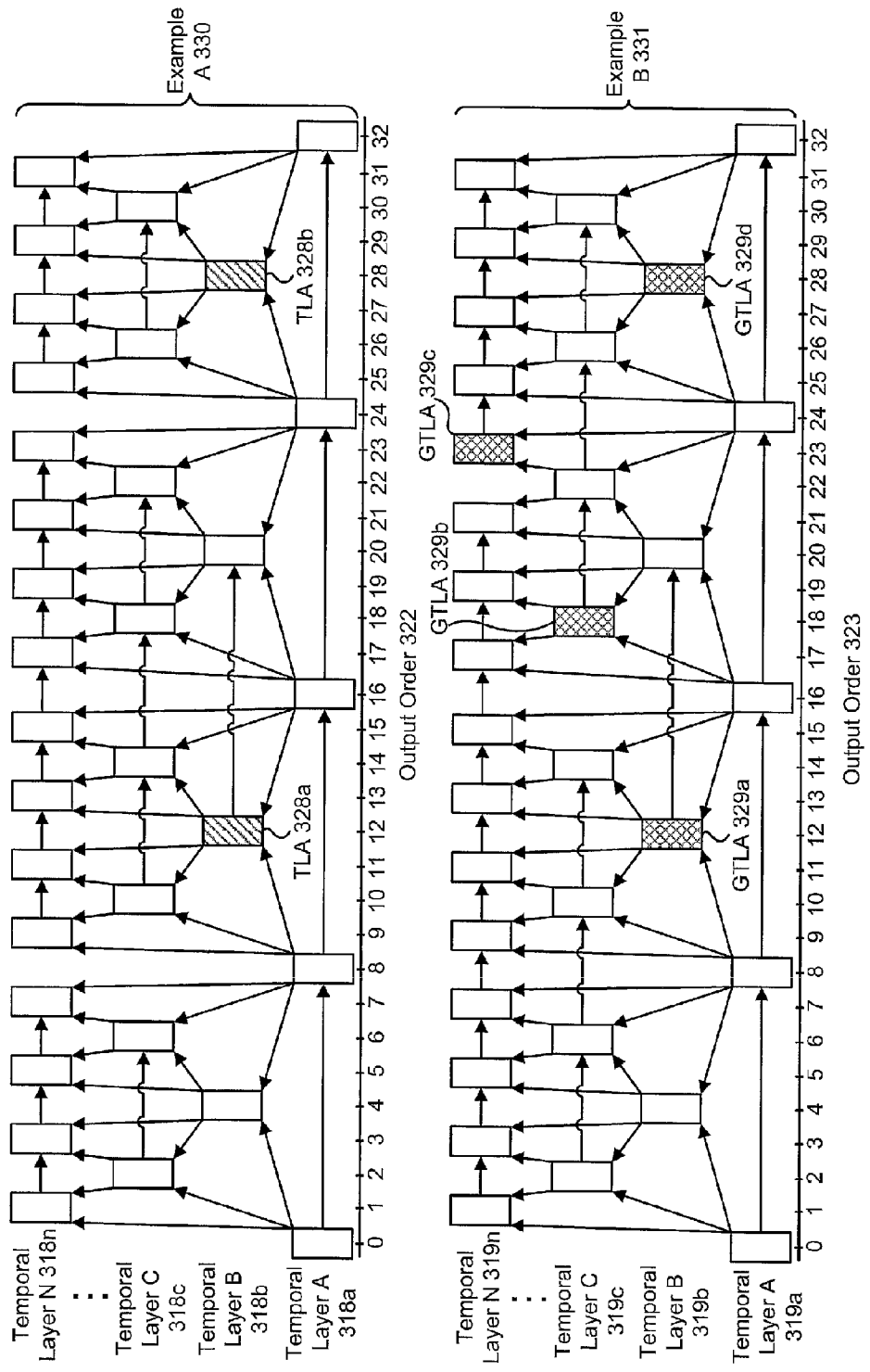
FIG. 3 is a block diagram illustrating two more examples of a coding structure.

FIG. 3 is a block diagram illustrating two more examples of a coding structure. Example A 330 illustrates a coding structure of a larger set of pictures when using TLA pictures 328 for temporal layer switching. Example B 331 illustrates a coding structure of a larger set of pictures with staggered GTLA pictures 329 used for temporal layer switching.

Example A 330 includes temporal layers 318*a-n* and an output order 322 similar to corresponding temporal layers 218*a-n* and output order 222 described in connection with example A 230 of FIG. 2. For instance, in FIG. 3, example A 330 may have pictures 0-32 outputted in the output order 322.

As shown in example A 330, there may be a number of temporal layers 318*a-n*. Each temporal layer 318 may include a different number of pictures. In some configurations, temporal layers 318 may be organized in hierarchal form. Each picture on the same temporal layer 318 may share the same temporal identifier. For example, all pictures on temporal layer A 318*a* may have temporal_id equal to zero and all pictures on temporal layer N 318*n* may have temporal_id equal to N−1. Higher temporal layers 318 with greater number of pictures may provide higher frame rates and higher resolution for decoded pictures.

The electronic device 102 may use a temporal layer switching functionality to switch between temporal layers 318. For example, the electronic device 102 may use a temporal layer switching point to indicate a switch between temporal layer A 318*a* and temporal layer B 318*b*. Temporal layer switching functionality may be indicated by TLA picture 328*a* and TLA picture 328*b*, shown in the output order 322 as pictures 12 and 28, respectively.

Example B 331 illustrates a coding structure with staggered GTLA pictures 329 used for temporal layer switching. Example B 331 includes temporal layers 319*a-n* and an output order 323 similar to corresponding elements 318*a-n* and 322 described in example A 330 of FIG. 3 and corresponding elements 218*a-n* and 222 described in connection with example A 230 of FIG. 2.

As shown in example B 331, there may be a number of temporal layers 319*a-n*. In some configurations, temporal layers 319 may be organized in hierarchal form. Higher temporal layers 319 with greater number of pictures may provide higher frame rates and higher resolution for decoded pictures.

The electronic device 102 may use a temporal layer switching functionality to switch between temporal layers 319. For example, the electronic device 102 may use a temporal layer switching point to indicate a switch between temporal layer C 319c and temporal layer N 318n.

The GTLA pictures 329a-d in example B 331 may indicate to an electronic device 102 to switch between temporal layers 319. The GTLA pictures 329a-d may be staggered between temporal layers 319. In other words, the GTLA pictures 329a-d may be located on different temporal layers. For example, GTLA picture 329a and GTLA picture 329d may be on temporal layer B 319b, one GTLA picture 329b may be on temporal layer C 319c and one GTLA picture 329c may be on temporal layer N 319n. In example B 331 of FIG. 3, GTLA 329a, GTLA 329b, GTLA 329c and GTLA 329d are shown in the output order 323 as pictures 12, 18, 23 and 28, respectively.

As described previously, GTLA pictures 329 may provide greater flexibility in the selection of reference pictures than TLA pictures 328, while still providing temporal layer switching functionality. This may be accomplished because GTLA pictures 329 allow more pictures to be used as reference pictures in a coding structure compared to coding structures with TLA pictures 328. Further, because additional pictures may be used as reference pictures, better compression efficiency may be achieved compared to compression rates of TLA pictures 328.

In some configurations, using GTLA pictures 329 among multiple temporal layers 319 allows for selection of desired frames in a step-by-step manner. For example, a full frame rate may be represented by "F" Hertz (Hz). In this example, temporal layers 319a-n are all used and each temporal layer 319a-n may represent a different frame rate. Temporal layer A 319a, temporal layer B 319b, temporal layer C 319c and temporal layer N 319n may have temporal identifiers of 0, 1, 2 and 3 respectively. A full frame rate uses all the temporal layers 319. In other words, the full frame rate, F Hz, employs all pictures having temporal_id equal to 0, 1, 2 or 3. By way of example, this may include all 32 pictures shown in example B 331.

However, in some instances, a substream, or less than the full frame rate, may be used. For instance, a substream using only temporal_ids 0, 1 and 2 may use half of the full frame rate, represented by F/2 Hz. For example, this may include all the pictures in temporal layer A 319a through temporal layer C 319c shown in example B 331, or 16 pictures.

A substream using only temporal_ids 0 and 1 may use a fourth of the full frame rate, represented by F/4 Hz. For example, this may include all the pictures in temporal layer A 319a through temporal layer B 319b shown in example B 331, or 8 pictures.

A substream using only temporal_id 0 may use an eighth of the full frame rate, represented by F/8 Hz. For example, this may include only pictures in in temporal layer A 319a shown in example B 331, or 4 pictures.

In some configurations, available bandwidth may determine if the full frame rate (e.g., F Hz) or a partial frame rate, (e.g., F/2 Hz, F/4 Hz, F/8 Hz) may be transmitted by an electronic device 102. As such, each temporal layer 319a-n and corresponding temporal identifier may be transmitted separately as its own multicast group.

In some configurations, the lowest frame rate (e.g., F/8 Hz) is transmitted first as a multicast group. Additionally, higher frame rates (e.g., F/4 Hz, F/2 Hz and F Hz) may be transmitted as additional multicast groups, respectively. For example, an electronic device 102 may start receiving a bitstream 110 including a multicast group substream (F/8 Hz) with only temporal layer A 319a pictures (e.g., temporal_id=0). Subsequently, the bitstream 110 may start to additionally include a multicast group substream (F/4 Hz) with temporal layer A 319a and temporal layer B 319b pictures (e.g., temporal_ids=1 and 2). However, the electronic device 102 cannot immediately start decoding the temporal layer B 319b pictures. Rather, the electronic device 102 must discard the temporal layer B 319b pictures.

While receiving pictures from temporal layer A 319a and temporal layer B 319b, the electronic device 102 may receive an indication of a GTLA picture 329a. For example, the indication may be a NAL unit type indicating a GTLA picture 329a. The GTLA picture 329a may indicate a temporal layer switching point to the electronic device 102. As this point, the electronic device 102 may start decoding both temporal layer A 319a and temporal layer B 319b pictures.

The electronic device 102 may continue to receive picture from additional temporal layers 319, such as pictures in temporal layer C 319c and temporal layer N 319n. Along with the additional temporal layers 319, the electronic device 102 may receive additional GTLA pictures 319, such as GTLA picture 329b and GTLA picture 329c to indicate temporal layer switching points. As such, the electronic device 102 may switch to a full frame rate, F Hz, using GTLA pictures 329 as temporal layer switching points. Thus, in this manner, GTLA pictures 329 allow for selection of desired frame rates in a step-by-step manner.

Figure 4:
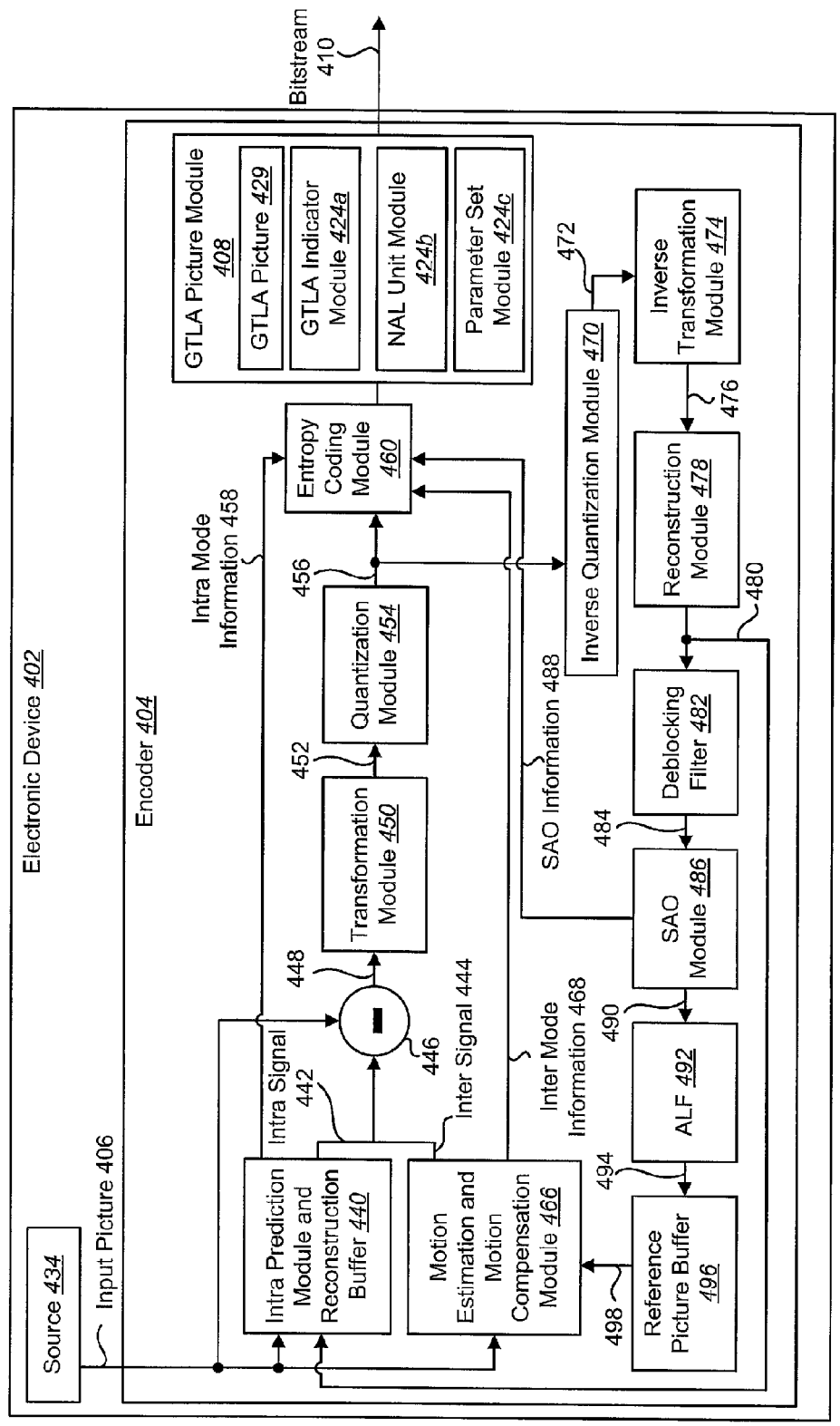
FIG. 4 is a block diagram illustrating one configuration of an encoder on an electronic device.

FIG. 4 is a block diagram illustrating one configuration of an encoder 404 on an electronic device 402. The electronic device 402 may be one example of the electronic device 102 described in connection with FIG. 1 above. For example, the electronic device 402 and encoder 404 may correspond to the electronic device A 102a and encoder 104 of FIG. 1.

One or more of the elements illustrated as included within the electronic device 402 may be implemented in hardware, software or a combination of both. The electronic device 402 may include encoder 404, which may be implemented in hardware, software or a combination of both. The encoder 404 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 404 may be a HEVC coder.

The electronic device 402 may include a source 434. The source 434 may provide picture or image data (e.g., video) as an input picture 406 to the encoder 404. Examples of the source 434 may include image sensors, memory, communication interfaces, network interfaces, wireless receivers, ports, etc.

One or more input pictures 406 may be provided to an intra-frame prediction module and reconstruction buffer 440. An input picture 406 may also be provided to a motion estimation and motion compensation module 466 and to a subtraction module 446.

The intra-frame prediction module and reconstruction buffer 440 may generate intra mode information 458 and an intra signal 442 based on one or more input pictures 406 and reconstructed data 480. The motion estimation and motion compensation module 466 may generate inter mode information 468 and an inter signal 444 based on one or more input pictures 406 and a reference picture buffer 496 reference picture buffer output signal 498. In some configurations, the reference picture buffer 496 may include data from one or more reference pictures in the reference picture buffer 496.

The encoder 404 may select between the intra signal 442 and the inter signal 444 in accordance with a mode. The intra signal 442 may be used in order to exploit spatial characteristics within a picture in an intra coding mode. The inter signal 444 may be used in order to exploit temporal characteristics between pictures in an inter coding mode. While in the intra coding mode, the intra signal 442 may be provided to the subtraction module 446 and the intra mode information 458 may be provided to an entropy coding module 460. While in the inter coding mode, the inter signal 444 may be provided to the subtraction module 446 and the inter mode information 468 may be provided to the entropy coding module 460.

Either the intra signal 442 or the inter signal 444 (depending on the mode) is subtracted from an input picture 406 at the subtraction module 446 in order to produce a prediction residual 448. The prediction residual 448 is provided to a transformation module 450. The transformation module 450 may compress the prediction residual 448 to produce a transformed signal 452 that is provided to a quantization module 454. The quantization module 454 quantizes the transformed signal 452 to produce transformed and quantized coefficients (TQCs) 456.

The TQCs 456 are provided to an entropy coding module 460 and an inverse quantization module 470. The inverse quantization module 470 performs inverse quantization on the TQCs 456 to produce an inverse quantized signal 472 that is provided to an inverse transformation module 474. The inverse transformation module 474 decompresses the inverse quantized signal 472 to produce a decompressed signal 476 that is provided to a reconstruction module 478.

The reconstruction module 478 may produce reconstructed data 480 based on the decompressed signal 476. For example, the reconstruction module 478 may reconstruct (modify) pictures. The reconstructed data 480 may be provided to a deblocking filter 482 and to the intra prediction module and reconstruction buffer 440. The deblocking filter 482 may produce a filtered signal 484 based on the reconstructed data 480.

The filtered signal 484 may be provided to a sample adaptive offset (SAO) module 486. The SAO module 486 may produce SAO information 488 that is provided to the entropy coding module 460 and an SAO signal 490 that is provided to an adaptive loop filter (ALF) 492. The ALF 492 produces an ALF signal 494 that is provided to the reference picture buffer 496. The ALF signal 494 may include data from one or more pictures that may be used as reference pictures.

The entropy coding module 460 may code the TQCs 456 to produce a bitstream 410 or other signal. Also, the entropy coding module 460 may code the TQCs 456 using Context-Adaptive Variable Length Coding (CAVLC) or Context-Adaptive Binary Arithmetic Coding (CABAC). In particular, the entropy coding module 460 may code the TQCs 456 based on one or more of intra mode information 458, inter mode information 468 and SAO information 488. In some configurations, the bitstream 410 may include coded picture data. In one example, the bitstream 410 is passed to a GTLA picture module 408 prior to being sent from the encoder 404 or to another electronic device 102.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 402 (e.g., the encoder 404) may determine the QP, resolution information and block type, which may be provided to the entropy coding module 460.

The entropy coding module 460 may determine the block size based on a block of TQCs 456. For example, block size may be the number of TQCs 456 along one dimension of the block of TQCs. In other words, the number of TQCs 456 in the block of TQCs may be equal to block size squared. For instance, block size may be determined as the square root of the number of TQCs 456 in the block of TQCs. Resolution may be defined as a pixel width by a pixel height. Resolution information may include a number of pixels for the width of a picture, for the height of a picture or both. Block size may be defined as the number of TQCs 456 along one dimension of a 2D block of TQCs.

In some configurations, the entropy coding module 460 sends a bitstream 410 or other signal including one or more pictures to a GTLA picture module 408. The GTLA picture module 408 may process a picture as a GTLA picture 429. In this case, the intra-frame prediction module and reconstruction buffer 440, the transformation module 450, the quantization module 454, the entropy coding module 460 and the motion estimation and motion compensation module 466 have encoded the GTLA 429 picture such that the GTLA picture 429 and all coded pictures with a temporal identifier (temporal_id) equal to the temporal identifier of the GTLA picture 429 that follow the GTLA picture 429 in decoding order shall not use inter prediction from any picture with temporal identifier greater than or equal to the temporal identifier of the GTLA picture 429 that precedes the GTLA picture 429 in decoding order. In some configurations, the GTLA picture module 408 may generate a new NAL unit type, flag or other indicator to show the presence GTLA picture 429. Further, the GTLA picture module 408 may modify or create a GTLA picture indicator to accompany or send with a bitstream 410 of data to be stored on the electronic device 402 or be sent to another electronic device 102.

The GTLA picture module 408 may further include a variety of modules or sub-modules for generating one or more GTLA picture indicators associated with an input picture 406. For example, the GTLA picture module 408 may include a GTLA indicator module 424a, NAL Unit (NALU) module 424b, parameter set module 424c or other module for generating a GTLA picture indicator associated with an input picture 406.

In some configurations, the GTLA picture indicator module 424a may generate a GTLA picture indicator. The GTLA picture indicator may be generated after a picture is partially encoded or passes through components of an electronic device 402.

In one configuration, the GTLA picture module 408 may generate a GTLA picture indicator associated with one or more input pictures 406 by creating or modifying a new NAL unit type. In one example, a NAL unit module 424b may generate a NAL unit associated with one or more GTLA pictures 429. In some configurations, the NAL unit module 424b may generate a NAL unit associated with one or more GTLA pictures 429 to indicate that an input picture 406 is a GTLA picture 429.

In some configurations, the GTLA picture indicator may be signaled in a parameter set. The parameter set module 424c may associate the GTLA picture indicator with a parameter set. For example, the parameter set may be a Sequence Parameter Set (SPS), Picture Parameter Set (PPS), Adaptation Parameter Set (APS), Video Parameter Set (VPS) or another parameter set. In some configurations, parameter set module 424c may associate the GTLA picture indicator with a slice header. In other words, the GTLA picture indicator may be signaled in the SPS, PPS, APS, VPS some other parameter set and/or the slice header.

In some configurations, the bitstream 410 may be transmitted to another electronic device 102. For example, the bitstream 410 may be provided to a communication interface, network interface, wireless transmitter, port, etc. For instance, the bitstream 410 may be transmitted to another electronic device 102 via LAN, the Internet, a cellular phone base station, etc. The bitstream 410 may additionally or alternatively be stored in memory or other component on the electronic device 402.

Figure 5:
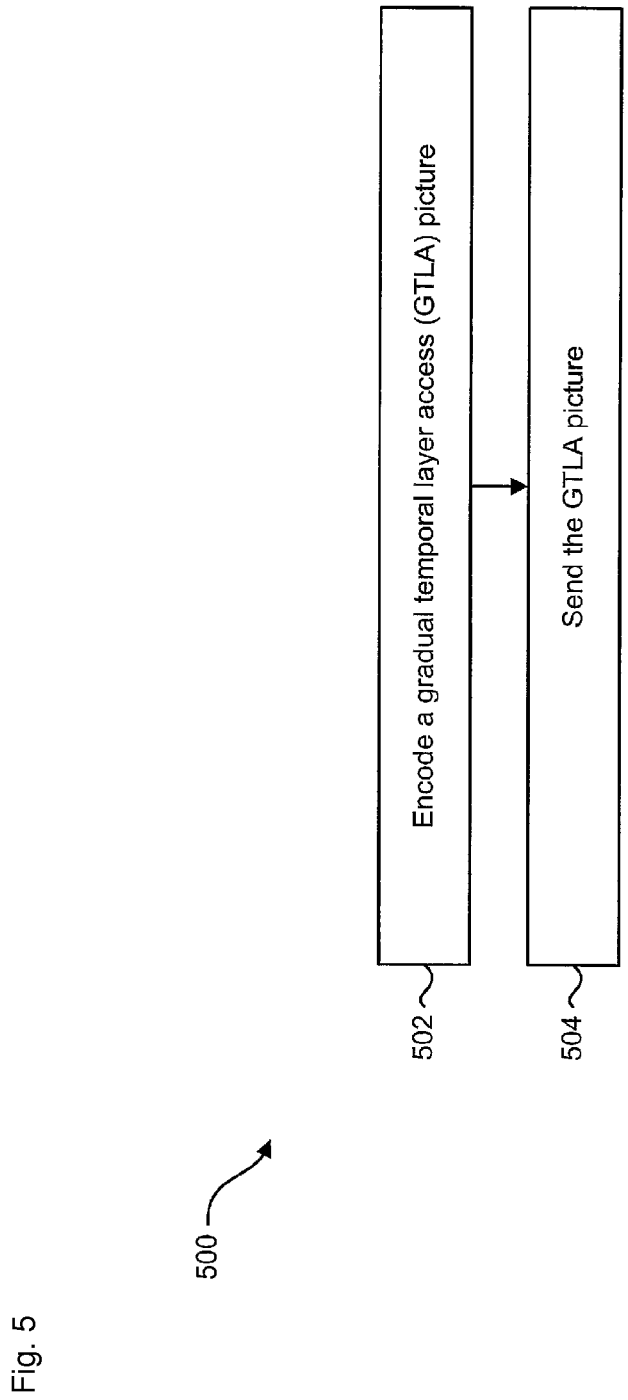
FIG. 5 is a flow diagram illustrating one configuration of a method for signaling a gradual temporal layer access (GTLA) picture.

FIG. 5 is a flow diagram illustrating one configuration of a method 500 for signaling a gradual temporal layer access (GTLA) picture 429. An electronic device 402 may encode 502 a gradual temporal layer access (GTLA) picture. The GTLA picture may be an input picture 406 or one of a stream of input pictures 406 obtained by an electronic device 402.

Encoding 502 the first picture may include representing an input picture 406 as digital data. For example, encoding 502 the first picture may include generating a string of bits that represent characteristics (e.g., color, luminance, spatial location, etc.) of an input picture 406. In some cases, an input picture 406 may be encoded 502 as a GTLA picture 429. One or more encoded pictures may be included in the bitstream 410 and may be sent to another electronic device 102 that includes a decoder 112.

The electronic device 402 may send 504 the GTLA picture 429. Sending 504 the GTLA picture may include transferring data (e.g., a bitstream 410) between components of an electronic device 102 or transmitting a bitstream 410 between one or more electronic devices 102. In one example, an encoder 404 on electronic device 402 may send a bitstream 410 including one or more GTLA pictures 429 to an electronic device 102. In some configurations, the bitstream 410 may be sent to a decoder 112 on electronic device B 102b. The GTLA indicator may be sent 504 via a wired or wireless transmission, for example.

Figure 6:
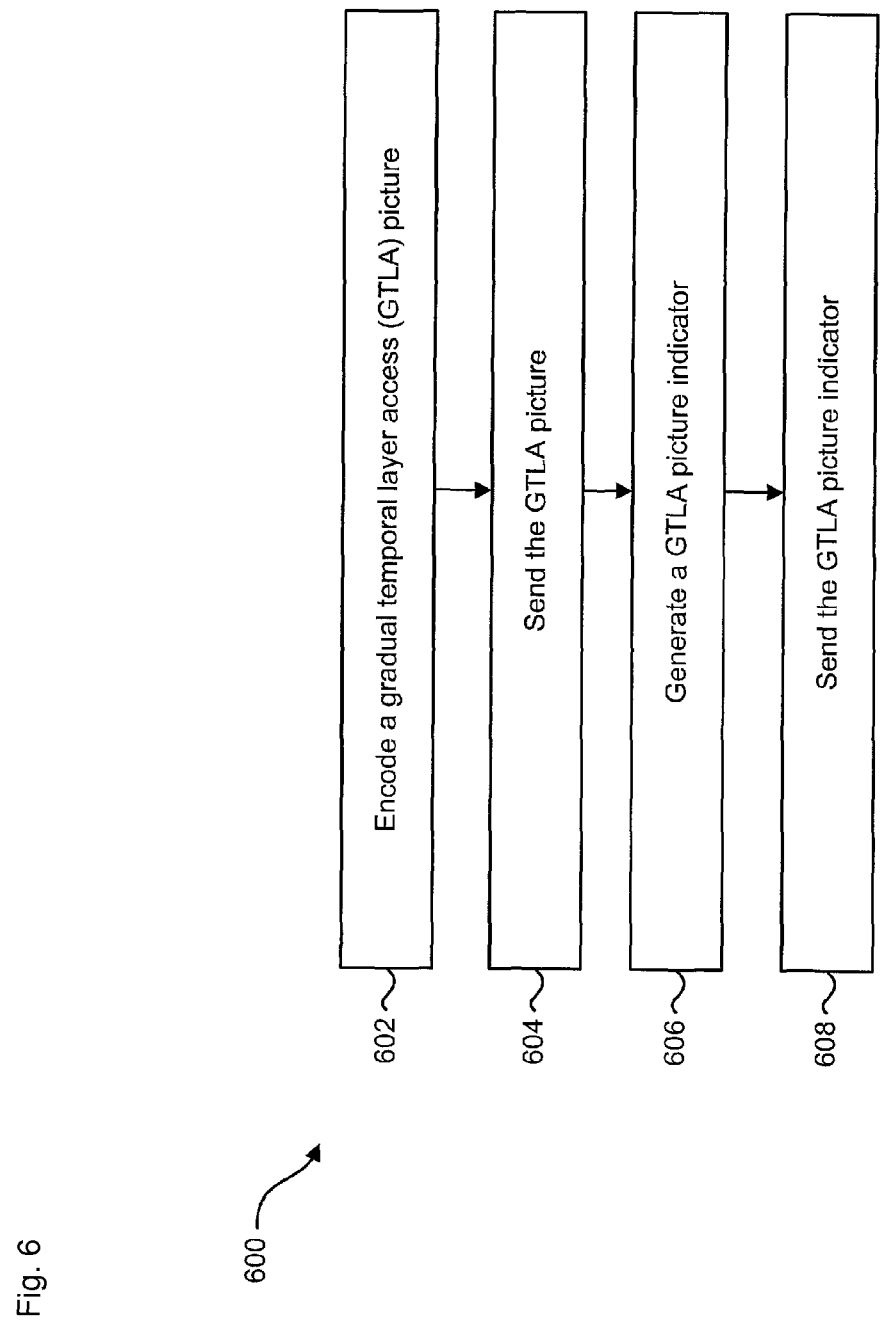
FIG. 6 is a flow diagram illustrating a more specific configuration of a method for signaling a gradual temporal layer access (GTLA) picture.

FIG. 6 is a flow diagram illustrating a more specific configuration of a method 600 for signaling a gradual temporal layer access (GTLA) picture 429. An electronic device 402 may encode 602 a gradual temporal layer access (GTLA) picture 429. For example, the electronic device 402 may encode an input picture 406 as the GTLA picture 429. For instance, the electronic device 402 may encode 602 the GTLA picture 429, as described above in connection with FIG. 5.

The electronic device 402 may send the GTLA picture 429. For example, the electronic device 402 may send 604 the GTLA picture 429 over a bitstream 410.

The electronic device 402 may generate 606 a GTLA picture indicator. The GTLA picture indicator may correspond to the GTLA picture 429. In some configurations, the electronic device 402 may generate 406 a GTLA picture indicator associated with a GTLA picture 429 by creating a NAL unit type corresponding to the GTLA pictures 429. For example, the electronic device 402 may generate 406 a NAL unit type 9 as illustrated in Table 2 below. Modifications from known approaches are bolded below in Table 2.

[Table 2]

Table 2 is organized into columns NAL unit type (nal_unit_type), content of NAL unit and RBSP syntax structure and NAL unit type class. When the value of NAL unit type is equal to 9 for all VCL NAL units of a particular picture, that particular picture may be referred to as a GTLA picture 429. In Table 2, a NAL unit type equal to 9 may indicate a coded slice of a GTLA picture. A NAL unit type equal to 9 may also indicate a non-TFD picture. In other words, a GTLA picture 429 with a NAL unit type equal to 9 may be referred to as a non-TFD GTLA picture.

A GTLA picture 429 and all coded pictures with a temporal identifier (temporal_id) equal to the temporal identifier of the GTLA picture 429 that follow the GTLA picture 429 in decoding order may not use inter prediction from any picture with temporal identifier greater than or equal to the temporal identifier of the GTLA picture 429 that precedes the GTLA picture 429 in decoding order. For example, turning to FIG. 3, example B 331, picture 18, as shown by the output order 323, is a GTLA picture 329b. Picture 18 is on temporal layer C 319c. Thus, in this example, pictures preceding picture 18, the GTLA picture 329b, in decoding order on temporal layer C 319c and temporal layer N 319n (e.g., pictures 1-3, 5-7, 9-11, 13-15 and 17) may not be used for inter prediction of any pictures on temporal layer C 319c that follow the GTLA picture 329b in decoding order (e.g., pictures 22, 26 and 30). Note that for the sake of simplicity, this example assumes the output order 323 to be the same as the decoding order. However, the output order 323 and the decoding order may be different from each other.

In addition, a GTLA picture 429 and all coded pictures with a temporal identifier equal to the temporal identifier of the GTLA picture that follow the GTLA picture 429 (e.g., pictures subsequent to the GTLA picture 429) in decoding order may use inter prediction from only pictures with temporal identifier less than the temporal identifier of the GTLA picture 429 that precedes the GTLA picture 429 in decoding order (e.g., pictures previous to the GTLA picture 429). For example, returning to picture 18 in example B 331 of FIG. 3, pictures on temporal layer C 319c that follow the GTLA picture 329b in decoding order (e.g., pictures 22, 26 and 30) may use inter prediction from pictures on temporal layer A 319a and temporal layer B 319b that precedes the GTLA picture 329b in decoding order (e.g., pictures 0, 4, 8, 12, 16, 20 and 24 and so on) Again, for the sake of simplicity, this example assumes the output order 323 to be the same as the decoding order.

In some approaches, if a NAL unit type is equal to 9 for a NAL unit including a slice of a particular picture, all VCL NAL units of that particular picture may have a NAL unit type equal to 9. In this example, a NAL unit type equal to 9 may indicate a coded slice of a GTLA picture 429. It should be appreciated that the NAL unit type indicating a GTLA picture 429 may equal a value other than 9.

In some configurations, a GTLA picture 429 may be a TLA picture 228. In one case, the GTLA picture 429 may be marked as a TLA picture 228. In another case, the GTLA picture 429 may be a TLA picture 228 and marked as a GTLA picture 228.

In some configurations, restrictions may be put on the reference picture set (RPS) of a GTLA picture 429. For example, when the current picture is a GTLA picture 429, no reference picture with a temporal identifier greater than or equal to the temporal identifier of the GTLA picture 429 may be included in a reference picture set (RPS) short-term current before list, a RPS short-term current after list or a RPS long-term current list for a current picture. In other words, there may be no reference picture in the RPS with temporal_id greater than that of the current picture included in RefPicSetStCurrBefore, RefPicSetStCurrAfter and/or RefPicSetLtCurr.

Additionally, in some configurations, restrictions may be put on the reference picture set (RPS) of pictures subsequent to the GTLA picture 429 having same temporal identifier value as that of the GTLA picture 429. For example, for pictures subsequent to a GTLA picture 429 having the same temporal identifier value as the temporal identifier value for the GTLA picture 429, no reference picture with a temporal identifier greater than or equal to the temporal identifier of the GTLA picture 429 may be included in a RPS short-term current before list, a RPS short-term current after list or a RPS long-term current list for a these pictures. In other words, there may be no reference picture in the RPS with temporal_id greater than that of the current picture included in RefPicSetStCurrBefore, RefPicSetStCurrAfter and/or RefPicSetLtCurr for the pictures subsequent to the GTLA picture 429 which has the same temporal identifier value as that of the GTLA picture 429.

In addition, when the current picture is a TLA picture 228, there may be no reference picture included in the RPS with a temporal identifier greater than or equal to the temporal identifier of the current picture. Also, there may be no reference picture included in the reference picture set that precedes, in output order 222, any CRA picture that precedes the current picture both in decoding order and output order 222. In addition in some cases, when the current picture is a TLA picture 228, there may be no reference picture included in the RPS with a temporal identifier greater than or equal to the temporal identifier of the current picture. Also, there may be no reference picture included in the reference picture set that precedes, in output order 222, any CRA picture that precedes the current picture both in decoding order and output order 222.

Further, when the first coded picture in the bitstream 110 is an IDR picture, there may be no entry in a RPS short-term current before list, a RPS short-term current after list or a RPS long-term current list that is equal to "no reference picture". In other words, when the first coded picture in the bitstream 110 is an IDR picture, there may be no entry in RefPicSetStCurrBefore, RefPicSetStCurrAfter or RefPicSetLtCurr that equals "no reference picture". Additionally, a reference picture cannot be included in more than one of the five RPS lists In some configurations, a NAL unit type that is equal to 3 or 9 may represent when a temporal identifier nesting flag is equal to 1 and a temporal identifier is greater than 0. In other words, if nal_unit_type equals 3 or 9, then temporal_id_nesting_flag equals 1 and temporal_id is greater than 0.

One benefit of generating a GTLA picture indicator as described herein may include increased flexibility in selection of reference pictures while providing temporal layer switching functionality. This may provide better compression efficiency compared to using TLA pictures 228.

GTLA pictures 429 may also allow for selection of desired frame rate in a step-by-step manner. Further, in some configurations the GTLA indicator may be obtained (by a decoder 112 or network node, for example) without decoding the SPS, PPS or other fields associated with a GTLA picture 429 or other picture.

In other configurations, the GTLA picture indicator may be generated 606 in a parameter set or slice header, for instance, using the parameter set module 424c. For example, the GTLA picture indicator may be signaled in a SPS, PPS, APS, VPS, some other parameter set and/or the slice header.

The electronic device 402 may send 608 the GTLA picture indicator. Sending 608 the GTLA picture indicator may include transferring data (e.g., a bitstream 410) between components of an electronic device 102 or transmitting a bitstream 410 between one or more electronic devices 102. Further, sending a GTLA picture indicator may include other similar approaches for transferring data between one or more electronic devices 102.

Figure 7:
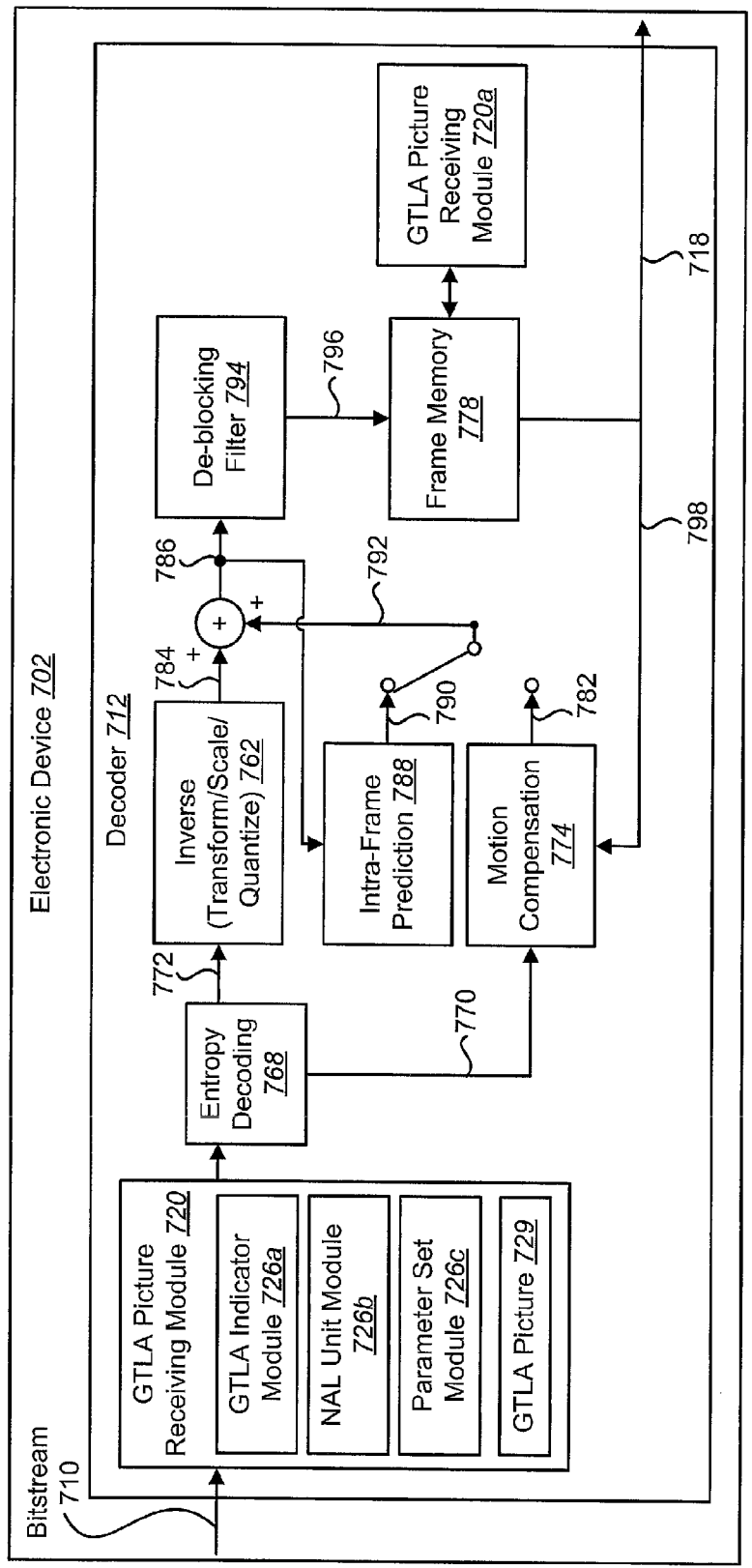
FIG. 7 is a block diagram illustrating one configuration of a decoder on an electronic device.

FIG. 7 is a block diagram illustrating one configuration of a decoder 712 on an electronic device 702. The electronic device 702 and the decoder 712 may be one example of the electronic device 102 and decoder 112 described in connection with FIG. 1.

The decoder 712 may be included in an electronic device 702. For example, the decoder 712 may be a HEVC decoder. The decoder 712 and/or one or more of the elements illustrated as included in the decoder 712 may be implemented in hardware, software or a combination of both. The decoder 712 may receive a bitstream 710 (e.g., one or more encoded pictures included in the bitstream 710) for decoding.

In some configurations, the received bitstream 710 may include received overhead information, such as a received slice header, received PPS, received buffer description information, etc. The encoded pictures included in the bitstream 710 may include one or more encoded reference pictures and/or one or more other encoded pictures. In some configurations, the bitstream 710 may include or be accompanied by one or more GTLA picture indicators.

In one configuration, the decoder 712 includes a GTLA picture receiving module 720. In some configurations, the electronic device 702 receives a bitstream 710 and sends the bitstream 710 through the GTLA picture receiving module 720. The GTLA picture receiving module 720 may be part of a decoder 712 or other component on the electronic device 702.

The GTLA picture receiving module 720 may include a variety of modules or sub-modules for receiving a GTLA picture 729 from the bitstream 710. For example, the GTLA picture receiving module 720 may include a GTLA indicator module 726a, NAL Unit (NALU) module 726b, parameter set module 726c or other module for receiving a GTLA picture 729 from the bitstream 710 prior to passing through certain elements of the decoder 712. The GTLA picture receive module 720 may also include a GTLA picture 729 which may be decoded by the decoder 712.

In some configurations, the GTLA picture indicator module 726a may receive a GTLA picture indicator. The GTLA picture indicator may be received after a picture is partially decoded or passes through components of an electronic device 702.

The NAL unit module 726b may determine whether a new NAL unit type indicating the presence of a GTLA picture 729 in the bitstream 710. For example, the NAL unit may be associated with a GTLA picture 729 and the NAL unit module 726b may receive a GTLA picture indication as a NAL unit type. For example, a NAL unit type equal to 9 may indicate a GTLA picture 729.

In some configurations, the parameter set module 726c may determine whether a GTLA picture 729 is present based on varying types of indicators. For example, the parameter set module 726c may receive a GTLA picture indicator in a parameter set or slice header such as the SPS, PPS, APS, VPS, some other parameter set and/or the slice header.

Received symbols (in the one or more encoded pictures included in the bitstream 710) may be entropy decoded by an entropy decoding module 768, thereby producing a motion information signal 770 and quantized, scaled and/or transformed coefficients 772.

The motion information signal 770 may be combined with a portion of a reference frame signal 798 from a frame memory 778 at a motion compensation module 774, which may produce an inter-frame prediction signal 782. The quantized, descaled and/or transformed coefficients 772 may be inverse quantized, scaled and inverse transformed by an inverse module 762, thereby producing a decoded residual signal 784. The decoded residual signal 784 may be added to a prediction signal 792 to produce a combined signal 786. The prediction signal 792 may be a signal selected from the inter-frame prediction signal 782 produced the motion compensation module 774 or alternatively the intra-frame prediction signal 790 produced by an intra-frame prediction module 788. In some configurations, this signal selection may be based on (e.g., controlled by) the bitstream 710.

The intra-frame prediction signal 790 may be predicted from previously decoded information from the combined signal 786 (in the current frame, for example). The combined signal 786 may also be filtered by a de-blocking filter 794. The resulting filtered signal 796 may be written to frame memory 778. The resulting filtered signal 796 may include a decoded picture.

The frame memory 778 may include overhead information corresponding to the decoded pictures. For example, the frame memory 778 may include slice headers, parameter information, cycle parameters, buffer description information, etc. One or more of these pieces of information may be signaled from an encoder (e.g., encoder 104). The frame memory 778 may provide a decoded picture 718 or other output signal.

In some configurations, the decoder 712 may include a GTLA picture receiving module 720a in communication with the frame memory 778. For example, the frame memory 778 may provide and/or retrieve a decoded GTLA picture 729 to the GTLA picture receiving module 720.

Figure 8:
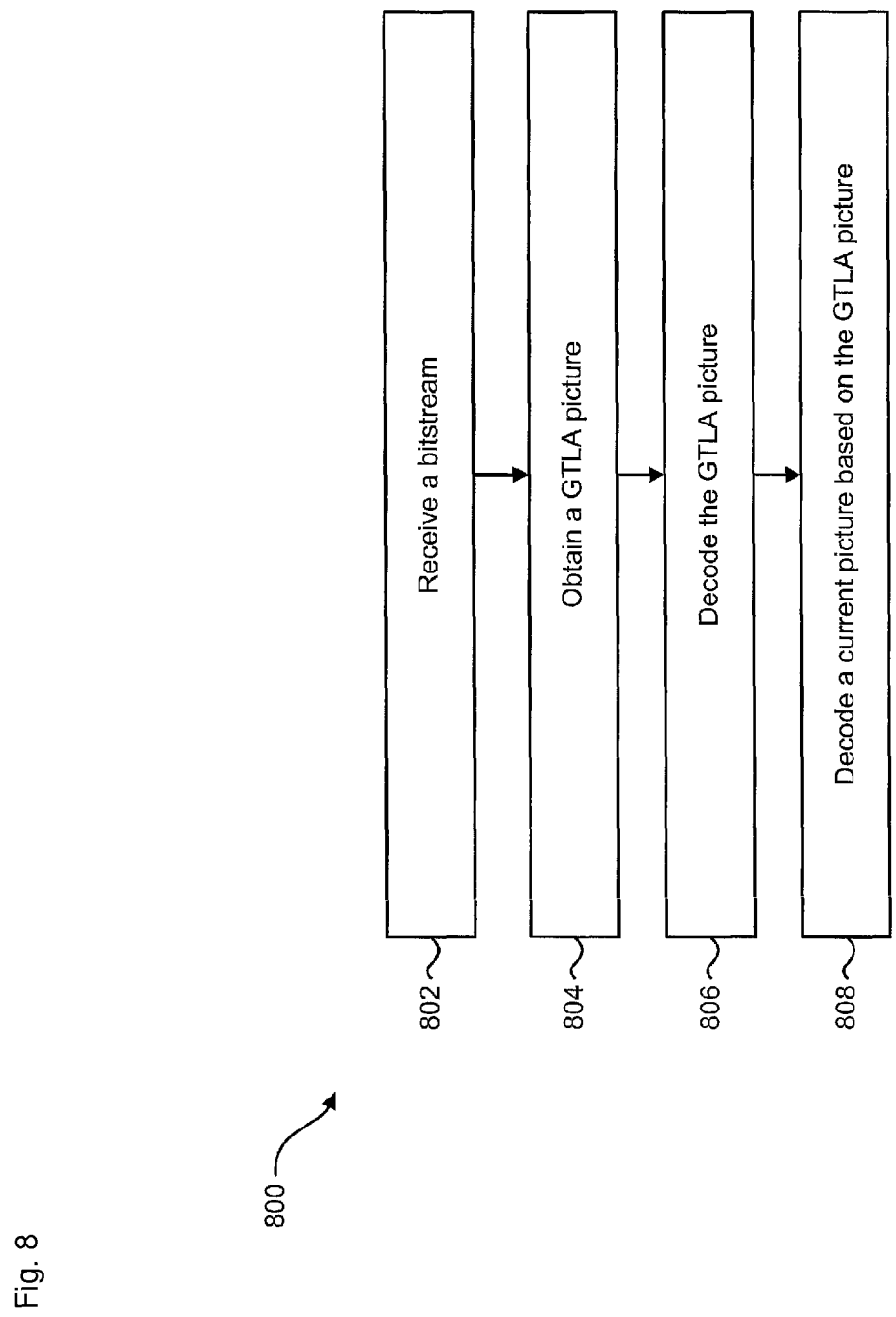
FIG. 8 is a flow diagram illustrating one configuration of a method for receiving a gradual temporal layer access (GTLA) picture.

FIG. 8 is a flow diagram illustrating one configuration of a method 800 for receiving a gradual temporal layer access (GTLA) picture 729. An electronic device 702 may receive 802 a bitstream 710. Receiving 802 the bitstream 710 may include obtaining, reading or otherwise accessing a bitstream 710. In some configurations, the bitstream 710 may be received from an encoder 104 on the same electronic device or on a different electronic device 102. For example, electronic device B 102b may receive the bitstream 110 from an encoder 104 on electronic device A 102a.

In some configurations, electronic device 702 may include a decoder 712 that receives the bitstream 710. The bitstream 710 may include encoded data based on one or more input pictures 106.

The electronic device 702 may obtain 804 a GTLA picture 729. The electronic device 702 may obtain the GTLA picture 729 from the bitstream 710. In other words, the bitstream 710 may also include a GTLA picture 729.

The electronic device 702 may decode 806 the GTLA picture 729. For example, the decoder 712 may decode 806 a portion of the bitstream 710 to produce a reference pictures that is stored in frame memory 778. As described above, GTLA pictures 729 provide more flexibility in selection of reference pictures than TLA pictures 228 because more reference pictures are available using a GTLA picture 729 coding structure. Thus, GTLA pictures 729 allow the decoder 712 to store and use additional reference pictures when decoding a current picture. In this manner, using GTLA pictures 729 may result in improved compression efficiency compared to using TLA pictures 228.

The electronic device 702 may decode 808 a current picture based on the GTLA picture 729. For example, the decoder 712 may decode 808 a portion of the bitstream 710 to produce a current picture based on the GTLA picture 729. The current picture may be decoded by a decoder 712 as described above.

Figure 9:
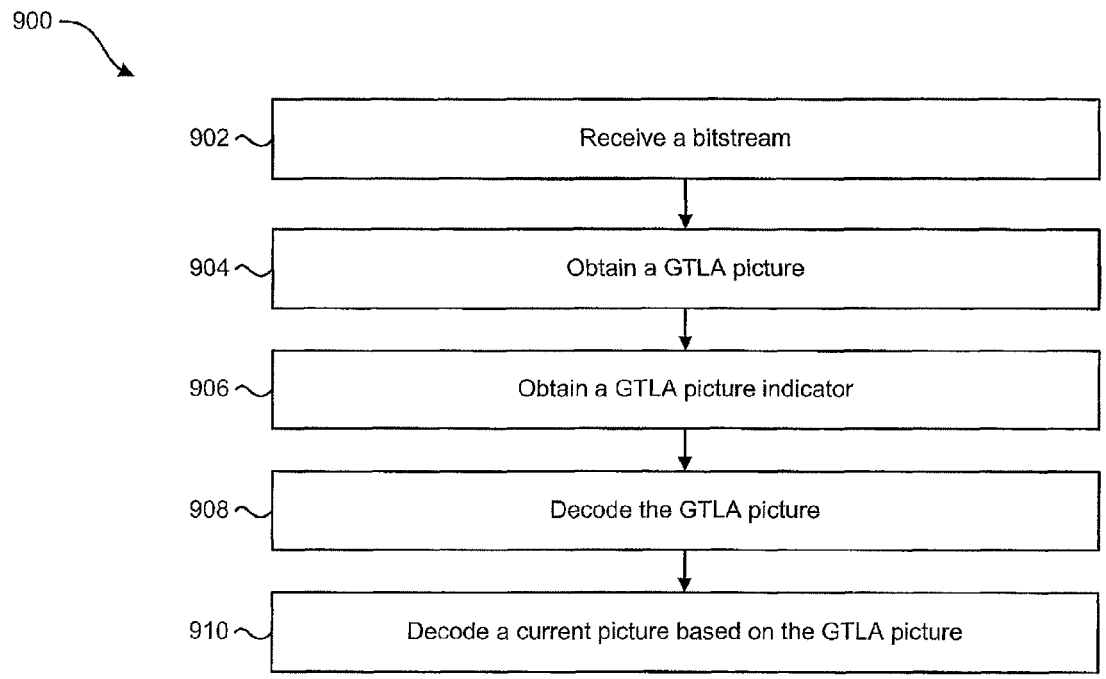
FIG. 9 is a flow diagram illustrating a more specific configuration of a method for receiving a gradual temporal layer access (GTLA) picture.

FIG. 9 is a flow diagram illustrating a more specific configuration of a method 900 for receiving a gradual temporal layer access (GTLA) picture 729. An electronic device 702 may receive 902 a bitstream 710. The bitstream 710 may be received as described above in connection with FIG. 8. For example, electronic device B 702 may receive 902 the bitstream 710 from the encoder 104 on electronic device A 102a.

The electronic device 702 may obtain 904 a GTLA picture 729. The electronic device 702 may obtain the GTLA picture 729 from a bitstream 710. In other words, the bitstream 710 may also include a GTLA picture 729.

A GTLA picture 729 and all coded pictures with a temporal identifier (temporal_id) equal to the temporal identifier of the GTLA picture 729 that follow the GTLA picture 729 in decoding order may not use inter prediction from any picture with temporal identifier greater than or equal to the temporal identifier of the GTLA picture 729 that precedes the GTLA picture 729 in decoding order.

In other words, a GTLA picture 729 and all coded pictures with a temporal identifier equal to the temporal identifier of the GTLA picture that follow the GTLA picture 729 in decoding order may use inter prediction from only pictures with temporal identifier less than the temporal identifier of the GTLA picture 729 that precedes the GTLA picture 729 in decoding order.

The electronic device 702 may obtain 906 a GTLA picture indicator. The GTLA picture indicator may be obtained 906 from the bitstream 710. The GTLA picture indicator may be obtained 906 from received data in the bitstream 710 corresponding to the GTLA picture 729. For example, the GTLA picture indicator may be a NAL unit type corresponding to the GTLA picture 729. For instance, the GTLA picture indicator may be a NAL unit type equal to 9, as illustrated in Table 2 above. In Table 2, a NAL unit type equal to 9 indicates a coded slice of a non-TFD GTLA picture.

In some configurations, the GTLA picture indicator may be obtained 906 from a parameter set or slice header. For example, the GTLA picture indicator may be obtained 906 from a SPS, PPS, APS, VPS, some other parameter set and/or the slice header.

In some configurations, the GTLA picture receive module 720 may obtain 906 a GTLA picture indicator by viewing a NAL unit type, a flag or an indicator associated with the GTLA pictures 729, coded slices created or modified by the GTLA picture indicator module 408 or another indicator that may indicate the presence of a GTLA picture 729.

The electronic device 702 may decode 908 the GTLA picture 729. For example, the decoder 712 may decode 908 a portion of the bitstream 710. Decoding 908 the GTLA picture 729 may occur as described above in connection with FIG. 8.

The electronic device 702 may decode 910 a current picture based on the GTLA picture 729. For example, the decoder 712 may decode 910 a portion of the bitstream 710 to produce a current picture based on the GTLA picture 729.

As described above, GTLA pictures 729 may allow the decoder 712 to store and use additional reference pictures when decoding a current picture. Employing GTLA pictures 729 may allow for greater flexibility in selecting reference pictures than with employing TLA pictures 228. In this manner, using GTLA pictures 729 may result in better compression efficiency compared to using TLA pictures 228.

Figure 10:
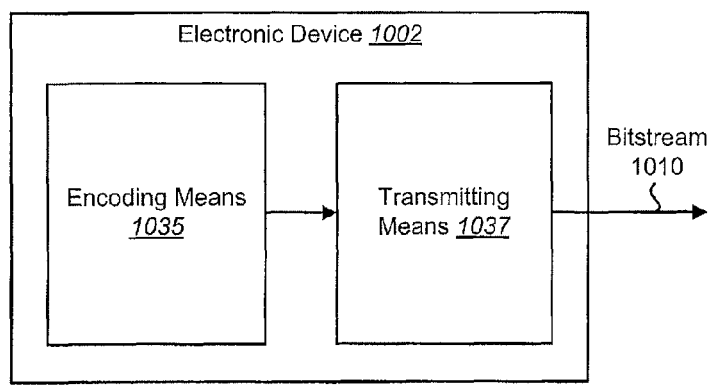
FIG. 10 is a block diagram illustrating one configuration of an electronic device in which systems and methods for signaling a gradual temporal layer access (GTLA) picture may be implemented.
Figure 12:
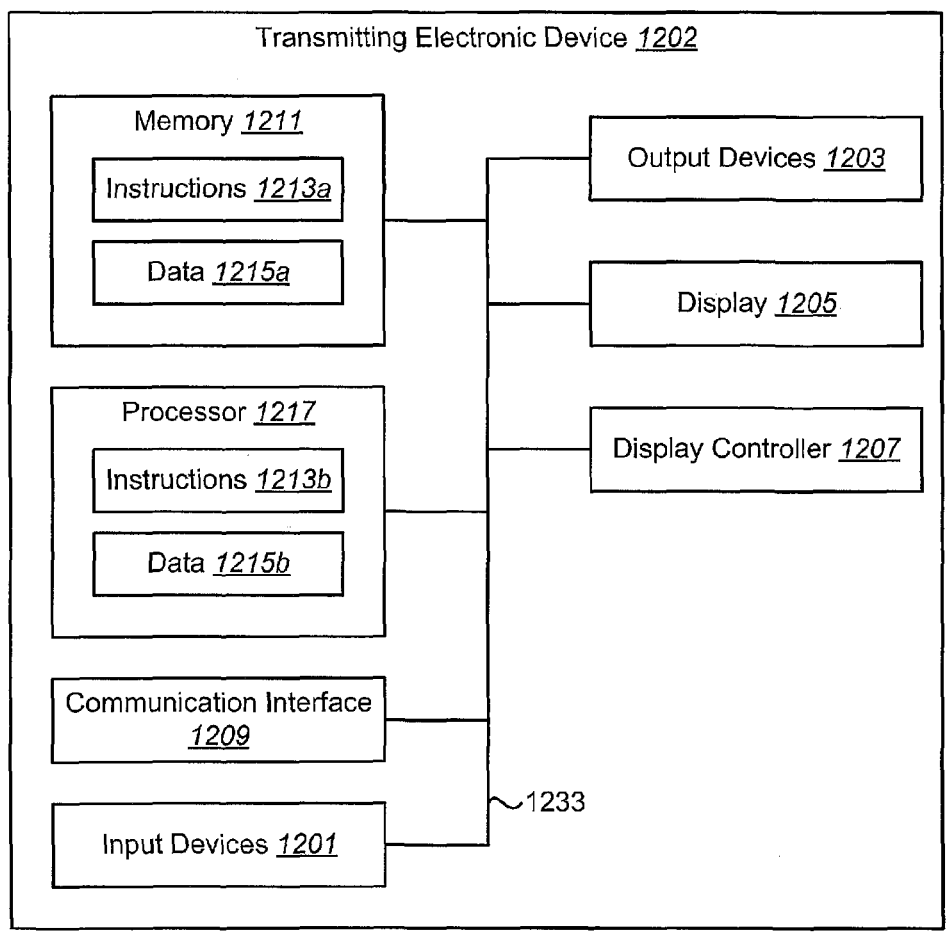
FIG. 12 is a block diagram illustrating various components that may be utilized in a transmitting electronic device.

FIG. 10 is a block diagram illustrating one configuration of an electronic device 1002 in which systems and methods for signaling a gradual temporal layer access (GTLA) picture 229 may be implemented. The electronic device 1002 may include a bitstream 1010, encoding means 1035 and transmitting means 1037. The encoding means 1035 and transmitting means 1037 may be configured to perform one or more functions described in connection with one or more of FIG. 5, FIG. 6 and other figures described herein. FIG. 12 below illustrates one example of a concrete apparatus structure of FIG. 10. Other various structures may be implemented to realize one or more of the functions of FIG. 1 and FIG. 4. For example, a DSP may be realized by software.

Figure 11:
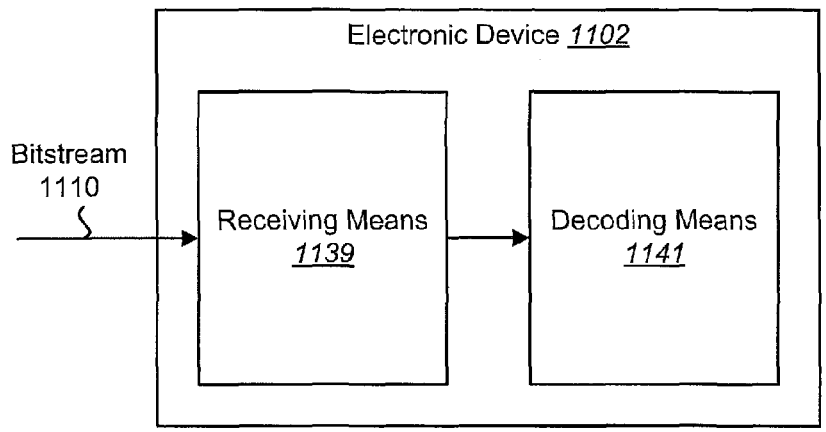
FIG. 11 is a block diagram illustrating one configuration of an electronic device in which systems and methods for receiving a gradual temporal layer access (GTLA) picture may be implemented.
Figure 13:
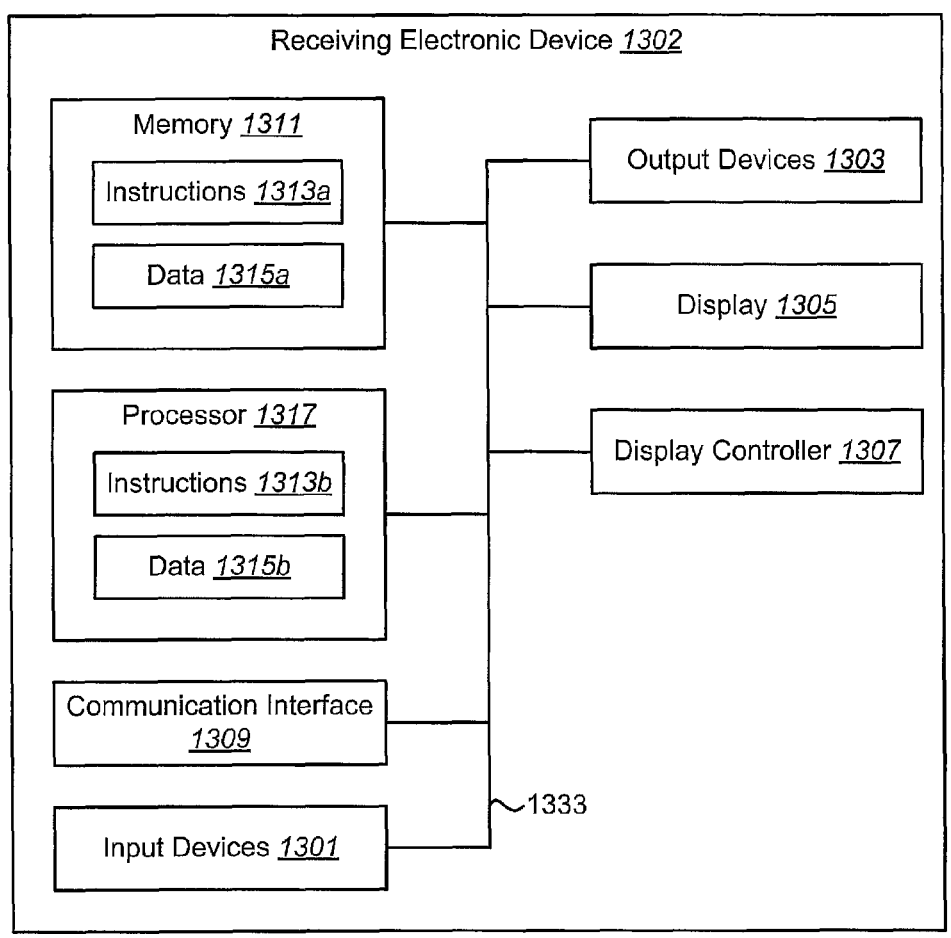
FIG. 13 is a block diagram illustrating various components that may be utilized in a receiving electronic device.

FIG. 11 is a block diagram illustrating one configuration of an electronic device 1102 in which systems and methods for receiving a gradual temporal layer access (GTLA) picture 229 may be implemented. The electronic device 1102 may include a bitstream 1110, receiving means 1139 and decoding means 1141. The receiving means 1139 and decoding means 1141 may be configured to perform one or more similar functions described in connection with FIG. 8, FIG. 9 and other figures described herein. FIG. 13 below illustrates one example of a concrete apparatus structure of FIG. 11. Other various structures may be implemented to realize one or more functions of FIG. 1 and FIG. 7. For example, a DSP may be realized by software.

FIG. 12 is a block diagram illustrating various components that may be utilized in a transmitting electronic device 1202. One or more of the electronic devices 102, 402, 702, 1002 and 1102 described herein may be implemented in accordance with the transmitting electronic device 1202 illustrated in FIG. 12.

The transmitting electronic device 1202 includes a processor 1217 that controls operation of the transmitting electronic device 1202. The processor 1217 may also be referred to as a Computer Processing Unit (CPU). Memory 1211, which may include both read-only memory (ROM), random access memory (RAM) or any type of device that may store information, provides instructions 1213*a* (e.g., executable instructions) and data 1215*a* to the processor 1217. A portion of the memory 1211 may also include non-volatile random access memory (NVRAM). The memory 1211 may be in electronic communication with the processor 1217.

Instructions 1213*b* and data 1215*b* may also reside in the processor 1217. Instructions 1213*b* and/or data 1215*b* loaded into the processor 1217 may also include instructions 1213*a* and/or data 1215*a* from memory 1211 that were loaded for execution or processing by the processor 1217. The instructions 1213*b* may be executed by the processor 1217 to implement one or more of the methods 500 and 600 disclosed herein.

The transmitting electronic device 1202 may include one or more communication interfaces 1209 for communicating with other electronic devices (e.g., receiving electronic device). The communication interfaces 1209 may be based on wired communication technology, wireless communication technology or both. Examples of a communication interface 1209 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The transmitting electronic device 1202 may include one or more output devices 1203 and one or more input devices 1201. Examples of output devices 1203 include a speaker, printer, etc. One type of output device that may be included in a transmitting electronic device 1202 is a display device 1205. Display devices 1205 used with configurations disclosed herein may utilize any suitable image projection technology, such as a cathode ray tube (CRT), liquid crystal display (LCD), light-emitting diode (LED), gas plasma, electroluminescence or the like. A display controller 1207 may be provided for converting data stored in the memory 1211 into text, graphics and/or moving images (as appropriate) shown on the display device 1205. Examples of input devices 1201 include a keyboard, mouse, microphone, remote control device, button, joystick, trackball, touchpad, touchscreen, lightpen, etc.

The various components of the transmitting electronic device 1202 are coupled together by a bus system 1233, which may include a power bus, a control signal bus and a status signal bus, in addition to a data bus. However, for the sake of clarity, the various buses are illustrated in FIG. 12 as the bus system 1233. The transmitting electronic device 1202, illustrated in FIG. 12, is a functional block diagram rather than a listing of specific components.

FIG. 13 is a block diagram illustrating various components that may be utilized in a receiving electronic device 1302. One or more of the electronic devices 102, 402, 702, 1002 and 1102 described herein may be implemented in accordance with the receiving electronic device 1302 illustrated in FIG. 13.

The receiving electronic device 1302 includes a processor 1317 that controls operation of the receiving electronic device 1302. The processor 1317 may also be referred to as a CPU. Memory 1311, which may include both read-only memory (ROM), random access memory (RAM) or any type of device that may store information, provides instructions 1313*a* (e.g., executable instructions) and data 1315*a* to the processor 1317. A portion of the memory 1311 may also include non-volatile random access memory (NVRAM). The memory 1311 may be in electronic communication with the processor 1317.

Instructions 1313*b* and data 1315*b* may also reside in the processor 1317. Instructions 1313*b* and/or data 1315*b* loaded into the processor 1317 may also include instructions 1313*a* and/or data 1315*a* from memory 1311 that were loaded for execution or processing by the processor 1317. The instructions 1313*b* may be executed by the processor 1317 to implement one or more of the methods 800 and 900 disclosed herein.

The receiving electronic device 1302 may include one or more communication interface 1309 for communicating with other electronic devices (e.g., transmitting electronic device). The communication interfaces 1309 may be based on wired communication technology, wireless communication technology or both. Examples of a communication interface 1309 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The receiving electronic device 1302 may include one or more output devices 1303 and one or more input devices 1301. Examples of output devices 1303 include a speaker, printer, etc. One type of output device that may be included in a receiving electronic device 1302 is a display device 1305. Display devices 1305 used with configurations disclosed herein may utilize any suitable image projection technology, such as a cathode ray tube (CRT), liquid crystal display (LCD), light-emitting diode (LED), gas plasma, electroluminescence or the like. A display controller 1307 may be provided for converting data stored in the memory 1311 into text, graphics, and/or moving images (as appropriate) shown on the display device 1305. Examples of input devices 1301 include a keyboard, mouse, microphone, remote control device, button, joystick, trackball, touchpad, touchscreen, lightpen, etc.

The various components of the receiving electronic device 1302 are coupled together by a bus system 1333, which may include a power bus, a control signal bus and a status signal bus, in addition to a data bus. However, for the sake of clarity, the various buses are illustrated in FIG. 13 as the bus system 1333. The receiving electronic device 1302 illustrated in FIG. 13 is a functional block diagram rather than a listing of specific components.

The term "computer-readable medium" refers to any available medium that can be accessed by a computer or a processor. The term "computer-readable medium", as used herein, may denote a computer- and/or processor-readable medium that is non-transitory and tangible. By way of example, and not limitation, a computer-readable or processor-readable medium may include RAM, ROM, EEPROM, CD-ROM or other optical disk storage, magnetic disk storage or other magnetic storage devices or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein includes one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. An electronic device for decoding a picture, comprising:
   (a) an obtaining circuit configured to obtain a Temporal Layer Access (TLA) picture, a Gradual Temporal Layer Access (GTLA) picture, which are followed by pictures in a decoding order; and
   (b) a decoding circuit configured to decode the TLA picture, the GTLA picture and the pictures following the TLA picture or the GTLA picture, wherein
   no picture that precedes the TLA picture in the decoding order with a temporal identifier greater than or equal to a temporal identifier of the TLA picture is used for inter prediction when decoding pictures that follow the TLA picture in the decoding order, and
   no picture that precedes the GTLA picture in the decoding order with a temporal identifier greater than or equal to a temporal identifier of the GTLA picture is used for inter prediction when decoding pictures that follow the GTLA picture in the decoding order with a temporal identifier equal to the temporal identifier of the GTLA picture.

2. The electronic device of claim 1, wherein when the decoding circuit decodes the TLA picture, no reference picture in a Reference Picture Set (RPS) has a temporal identifier greater than or equal to the temporal identifier of the TLA picture.

3. The electronic device of claim 1, wherein when the decoding circuit decodes the GTLA picture, no reference picture with a temporal identifier equal to the temporal identifier of the GTLA picture is included in a Reference Picture Set (RPS) short-term current before list, a RPS short-term current after list, and a RPS long-term current list.

4. The electronic device of claim 1, wherein when the decoding circuit decodes a current picture in the decoding order subsequent to the GTLA picture, the current picture having a temporal identifier equal to the temporal identifier of the GTLA picture, no reference picture with a temporal identifier equal to the temporal identifier of the current picture is included in a Reference Picture Set (RPS) short-term current before list, a RPS short-term current after list, and a RPS long-term current list.

5. The electronic device of claim 1, wherein the obtaining circuit obtains a picture indicator.

6. The electronic device of claim 5, wherein the picture indicator is a Network Access Layer (NAL) unit type.

7. The electronic device of claim 6, wherein the NAL unit type is associated with the GTLA picture.

8. The electronic device of claim 1, wherein the GTLA picture provides temporal layer switching functionality.

9. An electronic device for encoding a picture, comprising:
   (a) an encoding circuit configured to encode a Temporal Layer Access (TLA) picture and a Gradual Temporal Layer Access (GTLA) picture which are followed by pictures in a decoding order; and
   (b) a sending circuit configured to send the TLA picture, the GTLA picture, and the pictures following the TLA picture or the GTLA picture in the decoding order,
   wherein no picture that precedes the TLA picture in the decoding order with a temporal identifier greater than or equal to a temporal identifier of the TLA picture is used for inter prediction when decoding pictures that follow the TLA picture in the decoding order, and
   wherein no picture that precedes the GTLA picture in the decoding order with a temporal identifier greater than or equal to a temporal identifier of the GTLA picture is used for inter prediction when decoding pictures that follow the GTLA picture in decoding order with a temporal identifier equal to that of the GTLA picture.

10. The electronic device of claim 9, wherein when the encoding circuit encodes the TLA picture, no reference picture in a Reference Picture Set (RPS) has a temporal identifier greater than or equal to the temporal identifier of the TLA picture.

11. The electronic device of claim 9, wherein when the encoding circuit encodes the GTLA picture, no reference picture with a temporal identifier equal to the temporal identifier of the GTLA picture is included in a reference picture set (RPS) short-term current before list, a RPS short-term current after list, and a RPS long-term current list.

12. The electronic device of claim 9, wherein when the encoding circuit decodes the GTLA picture, no reference picture with a temporal identifier equal to the temporal identifier of the GTLA picture is included in a reference picture set (RPS) short-term current before list, a RPS short-term current after list, and a RPS long-term current list.

13. The electronic device of claim 9, further comprising a generating circuit configured to generate a picture indicator, wherein
the sending circuit sends the picture indicator.

14. The electronic device of claim 13, wherein the picture indicator is a Network Access Layer (NAL) unit type.

15. The electronic device of claim 14, wherein the NAL unit type is associated with the GTLA picture.

16. The electronic device of claim 9, wherein the GTLA picture provides temporal layer switching functionality.

17. A method for decoding a picture by an electric device, comprising:
(a) obtaining a Temporal Layer Access (TLA) picture, a Gradual Temporal Layer Access (GTLA) picture, which are followed by pictures in a decoding order; and
(b) decoding the TLA picture, the GTLA picture and the pictures following the TLA picture or the GTLA picture, wherein
no picture that precedes the TLA picture in the decoding order with a temporal identifier greater than or equal to a temporal identifier of the TLA picture is used for inter prediction when decoding pictures that follow the TLA picture in the decoding order, and
wherein no picture that precedes the GTLA picture in the decoding order with the temporal identifier greater than or equal to a temporal identifier of the GTLA picture is used for inter prediction when decoding pictures that follow the GTLA picture in the decoding order with a temporal identifier equal to the temporal identifier of the GTLA picture.

18. The method of claim 17, wherein when the TLA picture is being decoded, no reference picture in a Reference Picture Set (RPS) has a temporal identifier greater than or equal to the temporal identifier of the TLA picture.

19. The method claim 17, wherein the GTLA picture is being decoded, no reference picture with a temporal identifier equal to the temporal identifier of the GTLA picture is included in a Reference Picture Set (RPS) short-term current before list, a RPS short-term current after list, and a RPS long-term current list.

20. The method of claim 17, wherein when a current picture being decoded is in decoding order subsequent to the GTLA picture with the temporal identifier equal to a temporal identifier of the current picture, no reference picture with a temporal identifier equal to the temporal identifier of the current picture is included in a Reference Picture Set (RPS) short-term current before list, a RPS short-term current after list, and a RPS long-term current list.

21. The method of claim 17, further comprising: obtaining a picture indicator.

22. The method device of claim 21, wherein the picture indicator is a Network Access Layer (NAL) unit type.

23. The method device of claim 22, wherein the NAL unit type is associated with the GTLA picture.

24. The method of claim 17, wherein the GTLA picture provides temporal layer switching functionality.

* * * * *